United States Patent
Matsuo et al.

(10) Patent No.: US 10,980,024 B2
(45) Date of Patent: Apr. 13, 2021

(54) WIRELESS COMMUNICATION DEVICE AND WIRELESS COMMUNICATION METHOD

(71) Applicant: KABUSHIKI KAISHA TOSHIBA, Tokyo (JP)

(72) Inventors: Ryoko Matsuo, Tokyo (JP); Tomoko Adachi, Kanagawa (JP); Tomoya Tandai, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 86 days.

(21) Appl. No.: 15/443,056

(22) Filed: Feb. 27, 2017

(65) Prior Publication Data

US 2017/0171862 A1    Jun. 15, 2017

Related U.S. Application Data

(63) Continuation of application No. PCT/JP2016/058367, filed on Mar. 16, 2016.

(30) Foreign Application Priority Data

Mar. 20, 2015   (JP) .............................. JP2015-058351

(51) Int. Cl.
*H04W 72/04*   (2009.01)
*H04W 84/12*   (2009.01)
(Continued)

(52) U.S. Cl.
CPC ....... *H04W 72/0453* (2013.01); *H04L 5/0007* (2013.01); *H04L 5/0087* (2013.01);
(Continued)

(58) Field of Classification Search
CPC . H04W 72/0453; H04W 84/12; H04W 72/00; H04W 88/06; H04W 52/02;
(Continued)

(56) References Cited

U.S. PATENT DOCUMENTS

| 7,408,909 B2 | 8/2008 | Trainin et al. | |
| 7,751,356 B2 * | 7/2010 | Kim ................. | H04W 52/0216 370/311 |

(Continued)

FOREIGN PATENT DOCUMENTS

| JP | 2006-013559 A | 1/2006 |
| JP | 2008-187300 A | 8/2008 |

(Continued)

OTHER PUBLICATIONS

U.S. Appl. No. 15/452,285, filed Mar. 7, 2017, Kabushiki Kaisha Toshiba.

(Continued)

*Primary Examiner* — Jamaal Henson
*Assistant Examiner* — Chuong M Nguyen
(74) *Attorney, Agent, or Firm* — Foley & Lardner LLP

(57) ABSTRACT

According to one embodiment, a wireless communication device includes: a receiver configured to receive a first frame notifying a start of resource unit-based OFDMA (Orthogonal Frequency Division Multiple Access) communication via a first channel; and controlling circuitry configured to control, when the first frame is received, the receiver to perform standby operation at least in a first resource unit in a second channel different from the first channel, wherein the first resource unit includes one or more subcarriers among a plurality of subcarriers disposed in the second channel.

21 Claims, 24 Drawing Sheets

(51) Int. Cl.
*H04W 52/02* (2009.01)
*H04L 5/00* (2006.01)
*H04L 27/26* (2006.01)
*H04W 88/06* (2009.01)

(52) U.S. Cl.
CPC ............ *H04L 5/0092* (2013.01); *H04L 27/26* (2013.01); *H04L 27/2647* (2013.01); *H04W 52/0225* (2013.01); *H04W 84/12* (2013.01); *H04L 5/0023* (2013.01); *H04L 5/0048* (2013.01); *H04W 88/06* (2013.01); *Y02D 30/70* (2020.08)

(58) Field of Classification Search
CPC ............ H04W 52/0229; H04W 36/24; H04W 52/0206; H04W 52/0216; H04W 72/042; H04W 52/0212; H04W 76/28; H04W 68/025; H04W 88/02; H04W 88/08; H04L 5/0007; H04L 27/2601; H04L 5/001; H04L 5/008; H04L 5/0098; H04L 5/02; Y02D 70/00; Y02D 70/142; Y02D 70/168; Y02D 70/26; Y02D 70/20; Y02D 70/1262; Y02D 70/146
See application file for complete search history.

(56) References Cited

U.S. PATENT DOCUMENTS

| | | | |
|---|---|---|---|
| 8,023,480 B2 | 9/2011 | Kwon | |
| 8,320,358 B2 | 11/2012 | Wang et al. | |
| 8,780,728 B1* | 7/2014 | Woodley | H04L 5/0007 370/241 |
| 8,897,279 B2* | 11/2014 | Seok | H04W 16/26 370/310 |
| 8,918,137 B2* | 12/2014 | Niu | H04L 1/0003 370/315 |
| 8,934,504 B2* | 1/2015 | Schwartz | H04L 5/0007 370/480 |
| 9,736,871 B2* | 8/2017 | Kim | H04W 72/0413 |
| 10,212,086 B2* | 2/2019 | Merlin | H04W 72/042 |
| 2002/0159426 A1* | 10/2002 | Kanemoto | H04L 5/06 370/342 |
| 2004/0001429 A1* | 1/2004 | Ma | H04L 1/0618 370/210 |
| 2005/0135324 A1* | 6/2005 | Kim | H04L 1/005 370/343 |
| 2005/0243780 A1 | 11/2005 | Trainin et al. | |
| 2005/0265298 A1 | 12/2005 | Adachi et al. | |
| 2006/0120395 A1* | 6/2006 | Xing | H04B 7/0613 370/431 |
| 2006/0285517 A1* | 12/2006 | Kakani | H04W 72/1257 370/329 |
| 2007/0165731 A1* | 7/2007 | Xiao | H04L 5/0046 375/260 |
| 2008/0079735 A1* | 4/2008 | Selwan | G09G 3/3611 345/505 |
| 2008/0192622 A1* | 8/2008 | Scheim | H04L 1/0025 370/210 |
| 2009/0161587 A1* | 6/2009 | Ishii | H04W 52/0216 370/311 |
| 2009/0232053 A1* | 9/2009 | Taki | H04L 1/1614 370/328 |
| 2009/0310698 A1* | 12/2009 | Agarwal | H04L 1/0026 375/267 |
| 2010/0002641 A1* | 1/2010 | Li | H04L 5/0007 370/329 |
| 2010/0040011 A1* | 2/2010 | Kang | H04W 76/28 370/329 |
| 2010/0040015 A1 | 2/2010 | Ernstrom et al. | |
| 2010/0061284 A1* | 3/2010 | Chen | H04W 52/0229 370/311 |
| 2010/0080164 A1* | 4/2010 | Power | H04W 74/02 370/315 |
| 2010/0202372 A1* | 8/2010 | Chun | H04L 5/0091 370/329 |
| 2010/0202373 A1* | 8/2010 | Chun | H04L 1/0027 370/329 |
| 2010/0208669 A1* | 8/2010 | Chun | H04L 5/0007 370/329 |
| 2010/0272042 A1* | 10/2010 | Chun | H04L 1/0026 370/329 |
| 2011/0044302 A1 | 2/2011 | Toshimitsu et al. | |
| 2011/0053626 A1* | 3/2011 | Lim | 455/509 |
| 2011/0064019 A1* | 3/2011 | Chun | H04L 5/0053 370/315 |
| 2011/0075748 A1* | 3/2011 | Novak | H04L 27/2613 375/260 |
| 2011/0149890 A1* | 6/2011 | Chun | H04L 5/0007 370/329 |
| 2011/0183678 A1* | 7/2011 | Kerpez | H04W 24/06 455/450 |
| 2011/0188399 A1* | 8/2011 | Jung | H04B 1/713 370/252 |
| 2011/0216684 A1* | 9/2011 | Kim | H04W 52/0229 370/311 |
| 2011/0222486 A1 | 9/2011 | Hart | |
| 2011/0268070 A1* | 11/2011 | Guan | H04L 5/0007 370/329 |
| 2011/0305236 A1 | 12/2011 | Morioka | |
| 2012/0014336 A1 | 1/2012 | Seok | |
| 2012/0020268 A1* | 1/2012 | Sharma | H04H 20/42 370/311 |
| 2012/0140695 A1* | 6/2012 | Hunzinger | H04L 1/1812 370/315 |
| 2012/0182963 A1 | 7/2012 | Kneckt et al. | |
| 2012/0220228 A1* | 8/2012 | Tandai | H04W 72/02 455/41.1 |
| 2012/0294222 A1* | 11/2012 | Kim | H04L 5/001 370/312 |
| 2012/0320856 A1 | 12/2012 | Kim et al. | |
| 2013/0003679 A1* | 1/2013 | Seok | H04W 74/0808 370/329 |
| 2013/0022020 A1* | 1/2013 | Novak | H04L 1/14 370/330 |
| 2013/0029718 A1* | 1/2013 | Saito | H04W 36/24 455/525 |
| 2013/0170376 A1* | 7/2013 | Dinan | H04L 5/0053 370/252 |
| 2013/0188569 A1* | 7/2013 | He | H04W 28/16 370/329 |
| 2013/0201835 A1* | 8/2013 | Banerjea | H04W 74/0816 370/241 |
| 2013/0258996 A1* | 10/2013 | Jung | H04W 72/1284 370/330 |
| 2013/0272262 A1* | 10/2013 | Li | H04W 28/02 370/330 |
| 2013/0286882 A1* | 10/2013 | Lim | H04W 72/0406 370/252 |
| 2014/0016596 A1 | 1/2014 | Kim et al. | |
| 2014/0086200 A1* | 3/2014 | Seok | H04W 72/02 370/330 |
| 2014/0126506 A1 | 5/2014 | Horiuchi et al. | |
| 2014/0192713 A1* | 7/2014 | Park | H04B 7/2656 370/328 |
| 2014/0200014 A1* | 7/2014 | Iwai | G08B 27/006 455/450 |
| 2014/0204891 A1* | 7/2014 | Park | H04L 5/0007 370/329 |
| 2014/0226607 A1* | 8/2014 | Holma | H04L 1/1812 370/329 |
| 2014/0254452 A1* | 9/2014 | Golitschek Edler Von Elbwart | H04W 52/0219 370/311 |
| 2014/0301377 A1* | 10/2014 | Sugitani | H04B 7/212 370/337 |
| 2015/0063318 A1* | 3/2015 | Merlin | H04W 72/12 370/336 |
| 2015/0230271 A1* | 8/2015 | Takagi | H04L 12/413 370/329 |

(56) References Cited

U.S. PATENT DOCUMENTS

| | | | |
|---|---|---|---|
| 2015/0256219 A1 | 9/2015 | Linden et al. | |
| 2015/0341933 A1 | 11/2015 | Aboul-Magd et al. | |
| 2016/0029389 A1 | 1/2016 | Merlin et al. | |
| 2016/0227579 A1* | 8/2016 | Stacey | H04W 74/0833 |
| 2017/0034723 A1* | 2/2017 | Anand | H04W 36/0088 |
| 2017/0064598 A1* | 3/2017 | Jain | H04W 36/14 |
| 2017/0181164 A1* | 6/2017 | Tandai | H04W 84/12 |
| 2018/0054810 A1* | 2/2018 | Shinohara | H04W 72/0406 |
| 2018/0219714 A1* | 8/2018 | Porat | H04L 5/00 |
| 2019/0124657 A1 | 4/2019 | Kim et al. | |

FOREIGN PATENT DOCUMENTS

| | | |
|---|---|---|
| JP | 2009-171506 A | 7/2009 |
| JP | 2010-178086 A | 8/2010 |
| WO | WO-2013/168389 A1 | 11/2013 |
| WO | WO-2016/152683 A1 | 9/2016 |

OTHER PUBLICATIONS

Chu, Liwen et al.: "80MHz/160MHz TXOP Protection", IEEE 802.11-10/1096r7, IEEE Mentor, STMicroelectronics, Sep. 15, 2010, pp. 1-13, slide 7.

Chu, Liwen et al.: "RTS CTS Rule Amendment", IEEE 802.11-11/0059r1, IEEE Mentor, STMicroelectronics, Jan. 18, 2011, pp. 1-5, slide 2.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Stacey, Robert: "Specification Framework for TGax", IEEE 802.11-15/0132r15, Intel, Jan. 2016, pp. 1-43.

Stacey, Robert: "Specification Framework for TGax", IEEE 802.11-15/0132r2, Intel, Jan. 2015, pp. 1-3.

Stacey, Robert: "Specification Framework for TGax", IEEE 11-15-0132-02-00ax-spec-framework, Intel, Jan. 2015, pp. 1-3.

Stacey, Robert: "Specification Framework for TGax", IEEE 11-15-0132-17-00ax-spec-framework, Intel, May 2016, pp. 1-61.

Extended European Search Report issued in the European Patent Application No. 16768586.6 dated Oct. 4, 2018.

George Vlantis et al., presented at IEEE 802.11-10/1096r7, titled "SOM Hz/160M Hz Protection" have a date of Sep. 14, 2010, (Vlantis hereinafter) was published Sep. 14, 2010.

Liwen Chu et al., presented at IEEE 802.11-11/0059r1, titled "RTS CTS Rule Amendment" have a date of Jan. 17, 2011, (Chu hereinafter) was published Jan. 17, 2011.

U.S. Office Action on U.S. Appl. No. 15/452,285 dated Sep. 24, 2018.

George Vlantis et al., presented at IEEE 802.11-10/1096r7, titled "80MHz/160MHz Protection" have a date of Sep. 14, 2010, (Vlantis hereinafter) was published Sep. 14, 2010.

Final Office Action on U.S. Appl. No. 15/452,285 dated Jun. 6, 2019.

Notice of Allowance on U.S. Appl. No. 15/452,285 dated Nov. 27, 2019.

Supplemental Notice of Allowance on U.S. Appl. No. 15/452,285 dated Jan. 2, 2020.

* cited by examiner

| Frame Control | Duration | Address 1 | Address 2 | Address 3 | Sequence Control | Address 4 | QoS Control | HT Control | MU-MC Info. | Frame body | FCS |

FIG. 4

WIRELESS COMMUNICATION DEVICE AND WIRELESS COMMUNICATION METHOD

CROSS REFERENCE TO RELATED APPLICATIONS

This application is a Continuation of International Application No. PCT/JP2016/058367, filed on Mar. 16, 2016, the entire contents of which is hereby incorporated by reference.

FIELD

Embodiments of the present invention relate to a wireless communication device and a wireless communication method.

BACKGROUND

Multi-user multi-channel (MU-MC) communication in which a plurality of terminals simultaneously use a plurality of channels has been attracting attention. The MU-MC communication is called channel-based OFDMA (Orthogonal Frequency Division Multiple Access) communication as well. In the MU-MC communication, for example, a method of simultaneously transmitting data from a terminal (a base station, etc.) on a transmission side to a plurality of terminals on a reception side using a plurality of channels other than a primary channel has been examined. When the terminals on the reception side perform the MU-MC communication with the base station, if standby operation is performed in a large number of channels, power consumption increases. Therefore, it is desirable to suppress the standby operation in channels not used in the MU-MC communication by the own terminals. If time in which the standby operation is performed in the channels is long, power consumption increases. Therefore, it is desirable to reduce the time in which the standby operation is performed in the channels as much as possible.

BRIEF DESCRIPTION OF THE DRAWINGS

FIG. 4 is a diagram showing a basic format example of a frame in the embodiment;

DETAILED DESCRIPTION

According to one embodiment, a wireless communication device includes: a receiver configured to receive a first frame notifying a start of resource unit-based OFDMA (Orthogonal Frequency Division Multiple Access) communication via a first channel; and controlling circuitry configured to control, when the first frame is received, the receiver to perform standby operation at least in a first resource unit in a second channel different from the first channel, wherein the first resource unit includes one or more subcarriers among a plurality of subcarriers disposed in the second channel.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
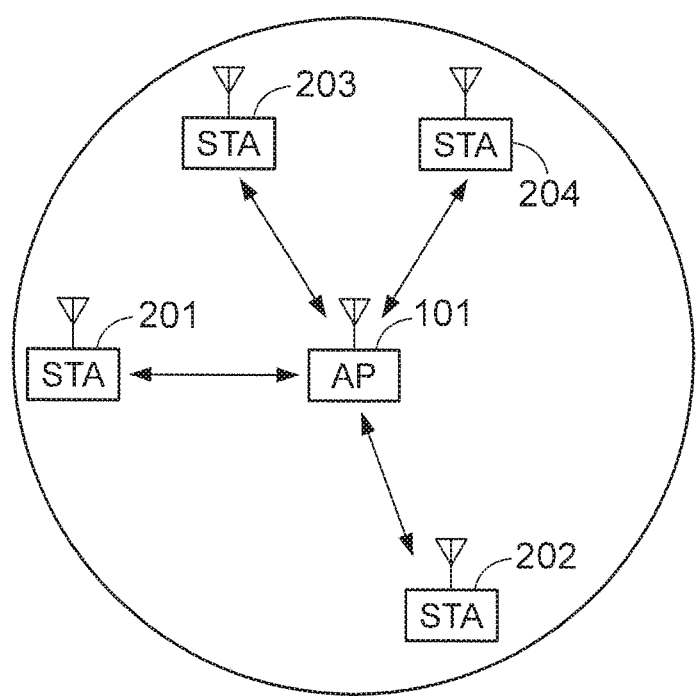
FIG. 1 is a configuration diagram of a wireless communication system including a base station and terminals according to an embodiment.

FIG. 1 is a configuration diagram of a wireless communication system including a wireless communication base station and wireless communication terminals according to a first embodiment. The wireless communication system communicates according to the IEEE802.11 standard. However, the IEEE802.11 standard is an example. The wireless communication system may communicate according to other wireless communication scheme. In the following explanation, the wireless communication base station is referred to as base station and the wireless communication terminal is referred to as terminal. The base station is a form of the terminal. The base station is mainly different from a non-base station terminal in that the base station has a relay function.

Terminals (STAB: STAtions) 201, 202, 203, and 204 are connected to a base station (AP: Access Point) 101 to form one wireless communication system or a wireless communication group. The connection means a state in which a wireless link is established. The terminals complete exchange of parameters necessary for communication through an association process with the base station, whereby the wireless link is established. In this state, the base station and the terminals grasp capabilities of the terminals and the base station each other. In FIG. 1, four terminals are shown. However, five or more terminals may be present or three or less terminals may be present.

The base station 101 can simultaneously perform reception or transmission with a plurality of terminals using a plurality of wireless channels (hereinafter, channels) within a predetermined frequency band. The base station allocates one or a plurality of channels to the terminals and simultaneously performs reception or transmission with the terminals. Such a communication scheme is called channel-based OFDMA (Orthogonal Frequency Division Multiple Access) scheme or multi-user multi-channel (MU-MC) communication scheme. A terminal corresponding to the channel-based OFDMA or the MU-MC communication scheme is sometimes called MU-MC compliant terminal (or IEEE802.11ax adapted terminal). A legacy terminal not adapted to the MU-MC may be present in the wireless communication system. The legacy terminal performs communication according to a standard such as IEEE802.11b/g/n/ac.

In this embodiment, it is assumed that, as the plurality of channels present within the predetermined frequency band, there are eight channels of a channel 1 to a channel 8 in order from a low frequency side. The numerals 1 to 8 of the channels 1 to 8 represent channel numbers. For example, the channel 1 means a channel having the channel number 1. Note that, in the figure, the base station and the terminals are drawn as if each of the base station and the terminals includes one antenna. However, actually, each of the base station and the terminals may include one or a plurality of antennas. Note that, when channels having assumed unit channel width (e.g., 20 MHz width) are disposed not to overlap one another, the channel numbers are numbers defining these channels for convenience. In this embodiment, it is assumed that the channel numbers are higher as center frequencies are higher. However, this is an example. The order of the center frequencies and the order of the channel numbers do not need to coincide with each other.

In this embodiment, the channel-based OFDMA scheme (the MU-MC communication) is used in this way. However, a resource unit-based OFDMA scheme for respectively allocating resource units, which has one or a continuous plurality of subcarriers as one unit, to terminals in a continuous frequency domain and simultaneously communicating may be used.

Figure 19:
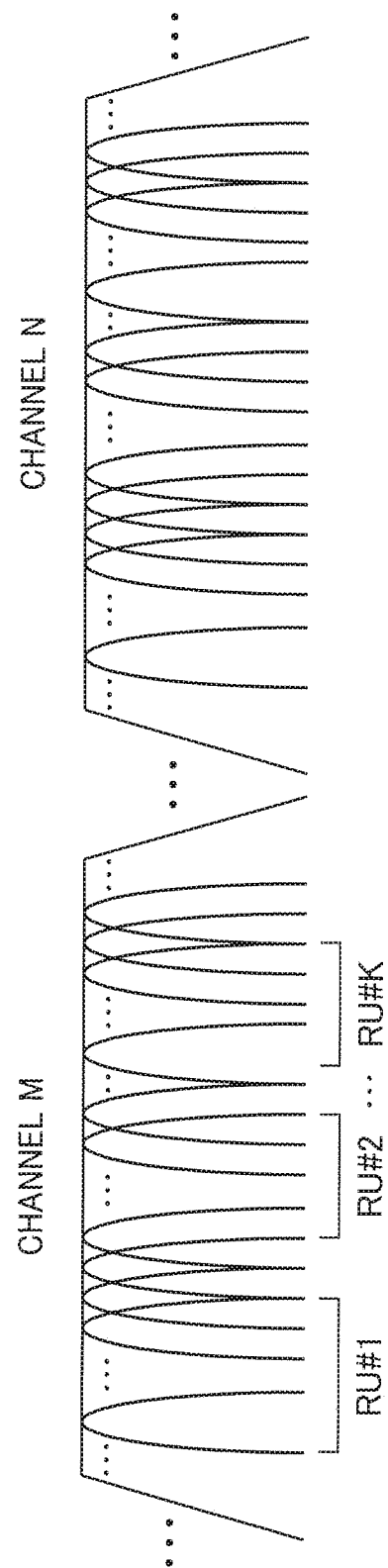
FIG. 19 is an explanatory diagram of a resource unit.

For example, as shown in FIG. 19, a plurality of channels are disposed in a frequency domain. The width (e.g., 20 MHz) of each one channel is a continuous frequency domain. In one channel, a plurality of subcarriers continuous in terms of frequency are orthogonal to one another. A resource unit (which may be referred to as sub-channel, resource block, or the like as well), which has one or a continuous plurality of subcarriers as one unit, is defined. One or a plurality of resource units are allocated to the terminals. A scheme for allocating the resource unit to the terminals and simultaneously communicating is referred to as resource unit-based OFDMA scheme. In FIG. 19, resource units (RU #1, RU #2, . . . , RU #K) secured in a continuous frequency domain in one channel (described as channel M) are shown. One or more subcarriers (guard subcarriers) may be disposed among the resource units. However, the guard subcarriers are not essential. The number of guard subcarriers is not limited to two and may be optional if the number is one or more.

The resource units may be allocated to the terminals in units of the resource units using one or a plurality of the channels 1 to 8 in this embodiment. In this case, the number of subcarriers per one resource unit is set the same in the channels. However, the number of subcarriers per one resource unit may be difference among the channels. The numbers of subcarriers in the resource units belonging to the same channel are set the same. However, the numbers of subcarriers may be different in the resource units. One or a plurality of resource units in one channel may be allocated to the terminals. A plurality of resource units belonging to a plurality of channels may be allocated to the terminals. The number of subcarriers in the channel may change according to the number of channels used in the resource unit-based OFDMA communication. For example, when one channel is used in the resource unit-based OFDMA communication, the number of subcarriers in the channel may be set to X. When two channels are used, the number of subcarriers per one channel may be set to X/2. In this case, when the number of subcarriers decreases, the bandwidth of the subcarriers increases according to the decrease in the number of subcarriers. Conversely, when the number of subcarriers increases, the bandwidth of the subcarriers decreases according to the increase in the number of subcarriers. Note that, when the resource units are decided to be all subcarriers in one channel, the operation of the resource unit-based OFDMA is considered to be substantially the same as the operation of the channel-based OFDMA.

The following explanation is based on the channel-based OFDMA scheme for allocating the channels to the terminals in units of channels. However, when the resource unit-based OFDMA scheme for allocating the resource units to the terminals in units of resource units is used, in the following explanation, the resource unit-based OFDMA scheme can be implemented by, for example, reading the channels as the resource units and reading the channel-based OFDMA (MU-MC) as the resource unit-based OFDMA. Note that, in a normal operation period in which communication of the OFDMA system is not performed irrespective of the resource unit base or the channel base, communication may be performed using, as a basic channel, a primary channel commonly recognized in a system. In the primary channel, monitoring and transmission and reception may be performed even while communication of the resource unit-based OFDMA scheme is performed. Note that, as directions of communication in transmitting data in the channel-based or the resource unit-based OFDMA, there are downlink from the base station to the terminals and uplink from the terminals to the base station. In this embodiment, the downlink is mainly assumed. However, in the case of the uplink, communication can be implemented as in this embodiment.

In the base station and the terminals shown in FIG. 1, wireless communication devices for performing communication with each other are mounted. The wireless communication devices mounted on the terminals communicate with the wireless communication device mounted on the base station. The wireless communication device mounted on the base station communicate with the wireless communication devices mounted on the terminals.

Figure 2:
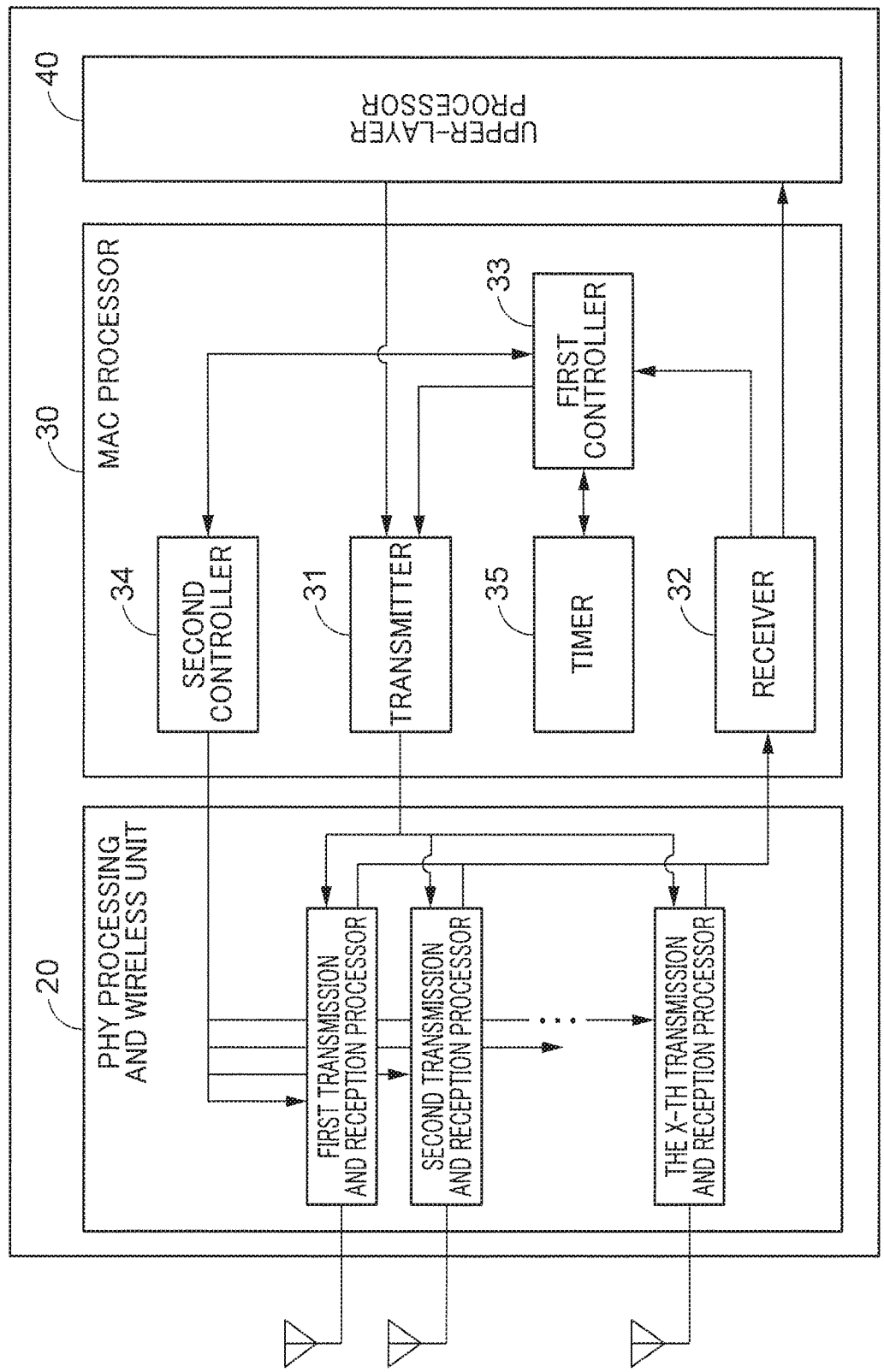
FIG. 2 is a block diagram showing a wireless communication device mounted on the terminal according to the embodiment.

FIG. 2 is a block diagram of the wireless communication devices mounted on the terminals.

The wireless communication device of the terminal includes one or a plurality of antennas, a PHY processing and wireless unit 20, a MAC processor 30, and an upper-layer processor 40. The MAC processor 30 includes a transmitter 31, a receiver 31, a first controller 33, a second controller 34, and a timer 35. A controller is divided into the first controller 33 and the second controller 34. However, the first controller 33 and the second controller 34 may be collected as one controller. The MAC processor 30 or a set of the MAC processor 30 and the PHY processing and wireless unit 20 corresponds to an integrated circuit for wireless communication in this embodiment. The entire or a part of processing of digital regions of the units or processing of the integrated circuit for wireless communication may be performed by software (a program) operating in a processor such as a CPU, may be performed by hardware, or may be performed by both of the software and the hardware. The terminal may include a processor that performs the entire or a part of the processing of the units.

The PHY processing and wireless unit 20 includes one or a plurality of transmission and reception processors. When X represents an integer equal to or larger than 1, the PHY processing and wireless unit 20 includes first to X-th transmission and reception processors. Antennas are respectively connected to the transmission and reception processors. One transmission and reception processor may be disposed for each one channel. When a plurality of channels are collectively processed, one transmission and reception processor may be disposed for the plurality of channels. When one transmission and reception processor is disposed for each one channel, if the wireless communication device is adaptable up to eight channels, the PHY processing and wireless unit 20 includes eight transmission and reception processors in order to perform processing for each one channel. In an example shown in the figure, the antenna is connected to each of the transmission and reception processors. However, one antenna may be connected to the plurality of transmission and reception processors in common. In this case, the plurality of transmission and reception processors, to which one antenna is connected in common, only have to extract signals of channels respectively allocated to the own processors. The transmission and reception processors may extract signals for all channel bands with an analog filter that covers all or a plurality of channels and extract signals of channels of the own processors with digital filters or may extract signals with analog filters corresponding to only channel bands of the own processors. An operation band of the analog filter may be variable according to an instruction of the second controller 34. The analog filter may have an operating band that is variable according to designation by the controller 34, or may be capable of supporting only signals in a preliminarily fixed band. Concerning transmission, the transmission and reception processors may respectively correspond to separate channels or may correspond to all or a plurality of channels. Information concerning channels processed by the transmission and reception processors is managed by the second controller 34. The second controller 34 allocates channels to be processed to the transmission and reception processors and indicates the allocated channels to the transmission and reception processors. The transmission and reception processors process the channels indicated by the second controller 34.

The first controller 33 manages an access to channels and controls transmission of a frame at desired timing. The first controller 33 may use the timer 35 in order to perform the frame transmission at the desired timing. The first controller 33 sets a time period until a time of the desired timing in the timer 35. When the timer 35 times out, the first controller 33 executes frame transmission. The transmitter 31 performs generation and transmission of a frame. When transmission of a frame is instructed from the first controller 33, the transmitter 31 generates the instructed frame and outputs the generated frame to the PHY processing and wireless unit 20. The PHY processing and wireless unit 20 inputs the frame input from the transmitter 31 to the transmission and reception processor of a channel corresponding to the frame. The transmission and reception processors perform processing of a desired physical layer on the frame input from the transmitter 31, perform D/A conversion, frequency conversion, and the like on the frame, and transmit a signal from the antennas to the space as a radio wave. Note that the frame in this embodiment is not limited to what is called frame in, for example, the IEEE802.11 standard and may be what is called packet.

The first controller 33 and the second controller 34 may access a storage device and read out information to be transmitted to the base station or may store information received from the base station in the storage device. The storage device may be a buffer (an internal memory) included in the first controller 33 or the second controller 34 or both of the controllers or may be a buffer (an external memory) provided on the outside of the first controller 33 or the second controller 34. The storage device may be a volatile memory such as a DRAM or may be a nonvolatile memory such as a NAND or a MRAM. Besides the memories, the storage device may be an SSD, a hard disk, or the like.

The transmission and reception processors of the PHY processing and wireless unit 20 convert signals received via the antennas from wireless frequencies into basebands and extract signals of channels corresponding to the basebands from baseband signals. The transmission and reception processors perform reception processing on the extracted signals to acquire frames and output the frames to the receiver 32. The reception processing includes, for example, A/D conversion, demodulation processing, and physical layer processing such as analysis of a physical header.

The receiver 32 performs analysis or the like of MAC headers of the frames input from the PHY processing and wireless unit 20. When determining from an analysis result of the MAC headers of the received frames that the received frames are data frames, the receiver 32 outputs the data frames to the upper layer processor 40 according to necessity. If the received frames are management frames or control frames, the receiver 32 outputs the frames to the first controller 33. According to whether the received frames are frames for which an ACK (Acknowledgement) response is necessary and whether the reception of the frames is successful, the receiver 32 outputs a generation instruction for an ACK frame to the first controller 33 or directly outputs the generation instruction to the transmitter 31. The receiver 32 can also output a generation instruction for a BlockAck frame (BA frame) instead of the ACK frame. The ACK frame and the BlockAck frame are forms of an acknowledgement response frame. The BA frame includes information representing success or failure of the received frames.

Note that the management frame used for management of a communication link between the terminal and the other terminals. Examples of the management frame include a beacon frame, an association request frame (a connection request frame for requesting connection to the base station), and an association response frame (a connection response frame, which is a response frame to the connection request frame). Besides, there is also a management frame defined anew in this embodiment explained below. The control frame is a frame used for control in transmitting and receiving (exchanging) the management frame and the data frame between the wireless communication device and the other wireless communication devices. Examples of the control frame include an RTS frame, a CTS frame, and an ACK frame. Details of the data frame, the management frame, and the control frame are explained in below in other embodiments.

The receiver 32 performs management of carrier sensing information via the transmission and reception processors of the PHY processing and wireless unit 20. As the carrier sensing information, there are physical carrier sensing information concerning busy and idle of a medium (CCA) input from the PHY processing and wireless unit 20 and virtual carrier sensing information based on medium reservation time described in the received frame. If one of the physical carrier sensing information and the virtual carrier sensing information indicates busy, the medium is regarded as busy. Transmission of signals is prohibited while the medium is busy. Note that, in the IEEE802.11 standard, the medium reservation time is decided to be described in a Duration field (see FIG. 4 referred to below) in the MAC header. When receiving a frame addressed to another terminal (i.e., not addressed to the own terminal), the receiver 32 determines that the medium is virtually busy during the medium reservation time described in the frame. Such a mechanism for virtually determining medium busy or a period of the virtual medium busy is called NAV (Network Allocation Vector).

When the terminal is connected to the base station 101, the terminal generates, under the control by the first controller 33, in the transmitter 31, a connection request frame, that is, an association request frame. As an example of a transmission method of the association request frame, for example, as in IEEE802.11ac, the association request frame is transmitted in a primary channel commonly recognized in a system. The association request frame may be transmitted in a plurality of channels including the primary channel. The primary channel may be decided beforehand as, for example, the channel 1. The base station can select and determine the primary channel out of a plurality of channels. Information indicated by the primary channel may be notified to the terminals from the base station 101 by a beacon frame.

The receiver 32 of the terminal receives an association response frame, which is a response to the association request frame from the base station 101. Consequently, the terminal is connected to the base station 101 and belongs to a wireless communication group formed by the base station 101.

The terminal receives, from the base station 101, notification of channels allocated by the base station as channels used in the MU-MC communication. The notification is performed by, for example, a beacon frame transmitted from the base station 101, the association response frame, or a separately defined management frame. When the management frame includes information designating the channels used in the MU-MC communication, the information is notified to the first controller 33. The second controller 34 grasps the notified channels as the channels used in the MU-MC communication. The configuration of information for notifying the channels allocated to the terminal may be optional as long as the channel numbers can be specified.

The terminal may notify information concerning channels that the own terminal requests to use (use requested channel information) to the base station 101 with a management frame or the like at an association time or any timing after the association time. The base station 101 may determine, on the basis of the use requested channel information, channels used by the terminals.

In this case, the terminal may determine, by performing carrier sensing, the channels that the own terminal desires to use. For example, the terminal performs carrier sensing from the channel 1 to the channel 8 via the PHY processing and wireless unit 20. Carrier sensing results in the channels are notified to the receiver 32 from the PHY processing and wireless unit 20. The first controller 33 selects, on the basis of the carrier sensor results of the channels, the channels that the terminal desires to use. For example, when the channels 1 and 2 are busy and the channels 3 to 8 are idle, the first controller 33 selects the channels out of the channel 3 to the channel 8. Channel selection conditions such as the number of channels to be used may be optional. Note that, in the case of the resource unit-based OFDMA scheme, carrier sensing may be performed in units of channels. In that case, the first controller 33 only has to select, out of channels in which the carrier sensing is idle, a resource unit that the terminal desires to use. Monitoring of the primary channel may be performed in the monitoring of the channels even in the case of the resource unit-based OFDMA.

The first controller 33 controls the transmission and reception processors to perform standby operation in channels for the MU-MC communication according to a start notification frame of the MU-MC communication received from the base station. The start notification frame has a form of a beacon frame, a separately defined management frame, or a control frame. The standby operation means standing by for a frame transmitted from the base station 101 in a receivable state. Specifically, the standby operation may include performing carrier sensing in a channel corresponding to the frame and setting the operation of the transmission and reception processor and the receiver to be capable of performing reception processing such as reception and demodulation of a signal of the frame in the channel corresponding to the frame. The start notification frame announces that the MU-MC communication is to be started. The start notification frame may have a function of notifying an MU-MC validity period, which is a period in which the MU-MC communication is possible.

Note that the terminal may notify the base station at an association time or any timing after the association time that the MU-MC communication can be executed and the function of the MU-MC communication is enabled (on). The base station may recognize, as a terminal capable of performing the MU-MC communication, the terminal that performs the notification.

In this embodiment, one of characteristics is to suppress time for the terminal to perform the standby operation in the channels for the MU-MC communication and achieve a reduction in power consumption. As an example, the terminal is caused to perform the standby operation in the channels for the MU-MC communication in the entire or a part of the MU-MC validity period and basically perform the standby operation in only the primary channel.

As a specific example, the standby operation in the channels for the MU-MC communication is started at a start time of the MU-MC validity period (also referred to as a start time of the MU-MC communication). The standby operation channels are reset to the original channel (the primary channel) at an end time of the MU-MC validity period (also referred to as an end time of the MU-MC communication). Information for specifying the start time may be notified from the base station as a start notification frame (a beacon frame, a management frame, etc.). The start time may be a value for specifying a specific time or may be specified as elapsed time from the transmission of the start notification frame. The start time may be set to a transmission time of the start notification frame. Notification of information for specifying the start time may be omitted. In this case, after reception of the start notification frame, the standby operation in the channels for the MU-MC communication only has to be immediately started. Information for specifying the end time may be notified from the base station as the start notification frame. The end time may be a value for specifying a specific time or may be specified as elapsed time from the start notification frame.

After the transmission of the start notification frame, the end time of the MU-MC validity period may be specified by transmission times of the beacon frame such as an end time of a beacon interval immediately before the beacon frame transmitted in an X-th time. After the transmission of the start notification frame, the MU-MC validity period may be set during continuous X times of the beacon interval and a value of the X may be notified. In this case, when the start notification frame is the beacon frame, the transmission time of the start frame may coincide with the start time of the MU-MC validity period. An end time of the last beacon interval (a transmission time of the beacon frame) may be equivalent to the end time of the MU-MC validity period.

After the reception of the start notification frame, when another start notification frame is received during the MU-MC validity period, it may be determined that the MU-MC validity period ends. The standby operation channels may be reset to the original channel (the primary channel). However, when the own terminal is designated in another start notification frame as well, the standby operation channels may be maintained as long as there is no change in the channels for the MU-MC communication.

When the standby operation channels are changed, a setup time for changing or starting the channels is necessary. For example, time for adjusting an operation band of an analog filter according to the changed channels is necessary. When it is necessary to start an analog filter anew, time for performing power supply and band adjustment to change the analog filter to an operable state is necessary. When it is necessary to start digital filters, time for reading out the digital filters from the memory and making the digital filters applicable is necessary. Therefore, in order to make it possible to start the standby operation in the channels for the MU-MC communication at the start time, it is necessary to start startup operation before the start time and, by the start time, change the digital filter to a state in which the standby operation is possible. Therefore, it is necessary to decide the start time of the MU-MC validity period such that the change of the standby operation channels can be completed until the start time after a target terminal of the MU-MC communication receives the start notification frame. When maximum time for the channel change is decided beforehand, the start time may be decided beforehand in the system as a time after fixed time (>=the maximum time) from the transmission of the start notification frame. The terminals may notify information representing times required for a channel change in the own terminals (setup time information) to the base station, respectively. The base station may determine the start time on the basis of a largest time among the times of the target terminals of the MU-MC communication. As the setup time information of the terminals, values of times required for setup may be notified or stages (levels) may be notified according to a value range corresponding to the setup time information among a plurality of value ranges such as 500 μs or less or 1 μs or less.

Note that the frame explained in this embodiment is not limited to, for example, what is called frame in the IEEE802.11 standard and may indicate what is called packet.

Figure 3:
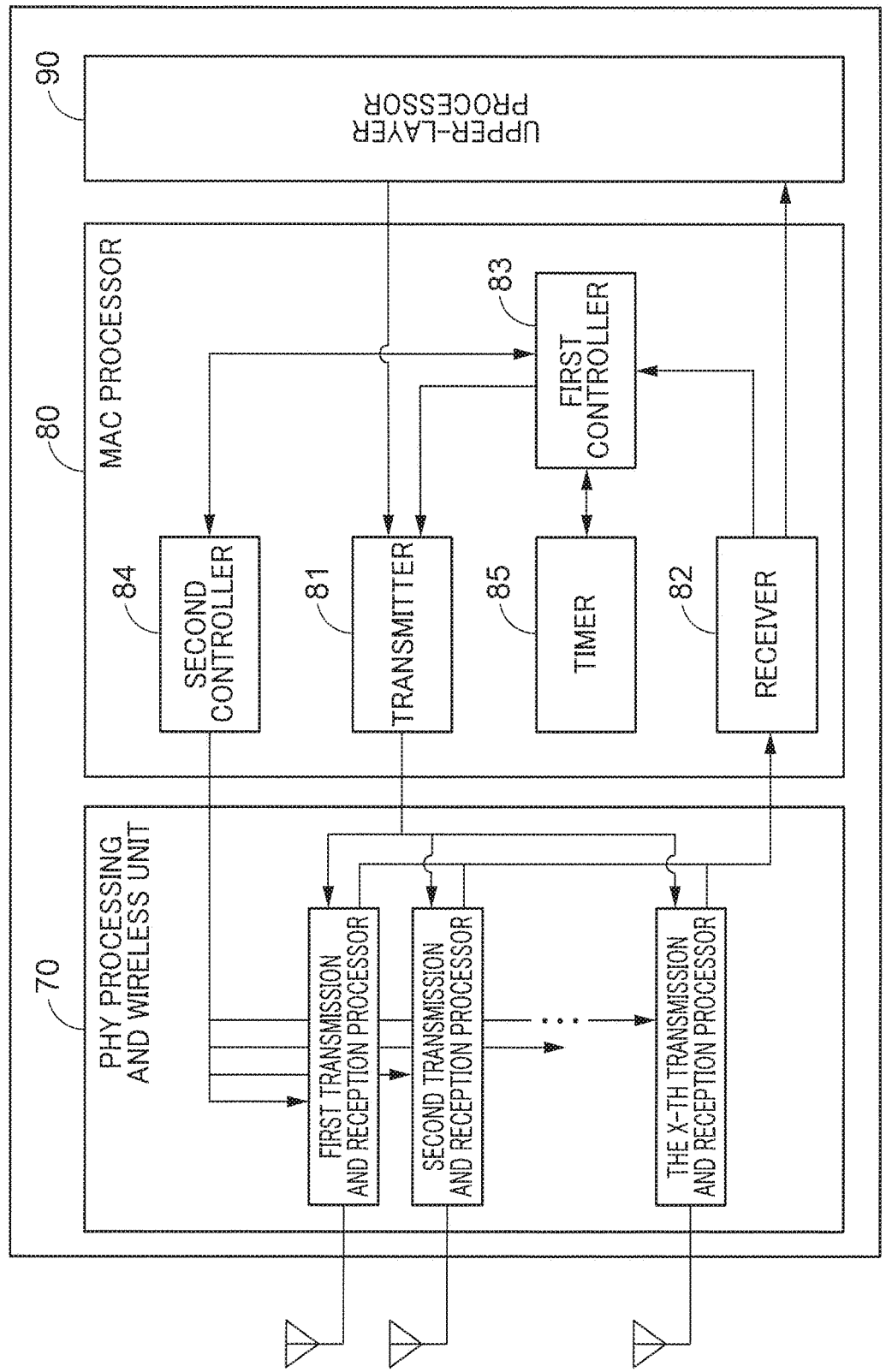
FIG. 3 is a block diagram showing a wireless communication device mounted on the base station according to the embodiment.

FIG. 3 is a block diagram of the wireless communication device mounted on the base station 101.

The wireless communication device of the base station 101 includes one or a plurality of antennas, a PHY processing and wireless unit 70, a MAC processor 80, and an upper-layer processor 90. The MAC processor 80 includes a transmitter 81, a receiver 82, a first controller 83, a second controller 84, and a timer 85. A controller is divided into the first controller 83 and the second controller 84. However, the first controller 83 and the second controller 84 may be collected as one controller. The MAC processor 80 or a set of the MAC processor 80 and the PHY processing and wireless unit 70 corresponds to the integrated circuit for wireless communication in this embodiment. The entire or a part of processing of digital regions of the units or processing of the integrated circuit for wireless communication may be performed by software (a program) operating in a processor such as a CPU, may be performed by hardware, or may be performed by both of the software and the hardware. The base station 101 may include a processor that performs the entire or a part of the processing of the units.

The PHY processing and wireless unit 70 includes one or a plurality of transmission and reception processors. When X represents an integer equal to or larger than 1, the PHY processing and wireless unit 70 includes first to X-th transmission and reception processors. Antennas are respectively connected to the transmission and reception processors. One transmission and reception processor may be disposed for each one channel. When a plurality of channels are collectively processed, one transmission and reception processor may be disposed for the plurality of channels. When one transmission and reception processor is disposed for each one channel, if the wireless communication device is adaptable up to eight channels, the PHY processing and wireless unit 70 includes eight transmission and reception processors in order to perform processing for each one channel. In an example shown in the figure, the antenna is connected to each of the transmission and reception processors. However, one antenna may be connected to the plurality of transmission and reception processors in common. In this case, the transmission and reception processors, to which one antenna is connected in common, only have to extract signals of channels respectively allocated to the own processors. The transmission and reception processors may extract signals for all channel bands with an analog filter covering all or a plurality of channels and extract signals of channels of the own processor with digital filters or may extract signals with an analog filter corresponding to only a channel band of the own processor. An operation band of the analog filter may be variable according to an instruction of the second controller 34. The analog filter may have an operating band that is variable according to designation by the controller 34, or may be capable of supporting only signals in a preliminarily fixed band. Concerning transmission, the transmission and reception processors may respectively correspond to separate channels or may correspond to all or a plurality of channels. Information concerning channels allocated to the transmission and reception processors is managed by the second controller 84. The second controller 84 allocates channels to be processed to the transmission and reception processors and indicates the allocated channels to the transmission and reception processors. The transmission and reception processors process the channels indicated by the second controller 84.

The transmission and reception processors of the PHY processing and wireless unit 70 convert signals received via the antennas from wireless frequencies into basebands and extract signals of channels corresponding to the basebands from baseband signals. The transmission and reception processors perform reception processing on the extracted signals to acquire frames and output the frames to the receiver 82. The reception processing includes, for example, A/D conversion, demodulation processing, and physical layer processing such as analysis of a physical header.

The receiver 82 performs analysis or the like of MAC headers of the frames input from the PHY processing and wireless unit 70. When determining from an analysis result of the MAC headers of the received frames that the received frames are data frames, the receiver 82 outputs the data frames to the upper layer processor 90 according to necessity. If the received frames are management frames or control frames, the receiver 32 outputs the frames to the first controller 83. According to whether the received frames are frames for which an ACK (Acknowledgement) response is necessary and whether the reception of the frames is successful, the receiver 32 outputs a generation instruction for an ACK frame to the first controller 83 or directly outputs the generation instruction to the transmitter 81. Like the receiver 32 of the terminal, the receiver 82 performs management of carrier sensing information. As explained above, the carrier sensing information may include both of physical carrier sensing information and virtual carrier sensing information.

The first controller 83 manages an access to a channel and controls transmission of a frame at desired timing. The first controller 83 may use the timer 85 in order to perform the frame transmission at the desired timing. The first controller 83 sets a time period until a time of the desired timing in the timer 85. When the timer 85 times out, the first controller 83 executes frame transmission. The first controller 83 includes allocator for allocating channels to the terminals for the MU-MU communication. The first controller 83 allocates the channels to the terminals using the allocator. The first controller 83 manages the channels allocated to the terminals. The first controller 83 may allocate the channels to the terminals according to any method. For example, when the first controller 83 receives use requested channel information from the terminals, the first controller 83 allocates the channels to the terminals on the basis of the information. Basically, the first controller 83 allocates the channels to the terminals not to overlap. However, the channels to be allocated may overlap among the terminals. During actual MU-MC communication, the first controller 83 may control the channels overlapping among the terminals not to be used. As a method of not using the use requested channel information, the first controller 83 may determine, on the basis of data amounts addressed to the terminals, channels to be allocated to the terminals.

The first controller 83 instructs the transmitter 81 to generate and transmit a frame including information for notifying the channels allocated to the terminals. As explained above, as the frame for notifying the information, there are an association response frame, a beacon frame, and other management frames. When determining a start of the MU-MC communication considering that, for example, data addressed to a plurality of terminals are present, the first controller 83 determines a terminal set as a target of the MU-MC communication. The first controller 83 instructs the second controller 84 to change standby operation channels of the own station to channels used in the MU-MC communication. Note that the standby operation may be performed in the primary channel even if the primary channel is not used in the MU-MC communication. The first controller 83 instructs the transmitter 81 to generate a frame for notifying the start of the MU-MC communication (a start notification frame) and transmit the start notification frame in the primary channel. For example, information for specifying a designated terminal is included in the start notification frame. Information for specifying the channel allocated to the terminal can also be included in the start notification frame. Besides, information for specifying a start time of an MU-MC validity period, information for specifying an end time, or a combination of these kinds of information may be included The first controller 83 and the second controller 84 may access a storage device and read out information to be transmitted to the terminal. The first controller 83 and the second controller 84 may store information received from the terminal in the storage device. The storage device may be a buffer (an internal memory) included in the first controller 83 or the second controller 84 or both of the controllers or may be a buffer (an external memory) provided on the outside of the first controller 83 or the second controller 84. The storage device may be a volatile memory such as a DRAM or may be a nonvolatile memory such as a NAND or a MRAM. Besides the memories, the storage device may be an SSD, a hard disk, or the like.

The transmitter 81 performs generation and transmission of frames (a management frame, a control frame, and a data frame) under the control by the first controller 83. When generation and transmission of a frame are instructed from the first controller 83, the transmitter 81 generates the designated frame and outputs the generated frame to the PHY processing and wireless unit 70. When the frame to be transmitted is the data frame, data stored in a body field of the data frame is data acquired from the upper-layer processor 40. The PHY processing and wireless unit 70 inputs the frame generated by the transmitter 81 to the transmission and reception processor corresponding to the frame. The transmission and reception processors perform processing of a desired physical layer on the frame input from the transmitter 81 to generate a physical packet, perform D/A conversion, frequency conversion, and the like on the physical packet to generate a signal having a radio frequency, and transmit the signal from the antenna to the space as a radio wave.

A basic format example of the frame in this embodiment is shown in FIG. 4.

The frame format shown in FIG. 4 includes fields of a MAC header, a frame body, and an FCS (Frame Check Sequence). The data frame, the management frame, and the control frame are basically based on the format. A part of the fields is sometimes omitted as appropriate. The association request frame, the association response frame, the beacon frame, and the like explained above are also the management frame. Therefore, the frames also have this frame format.

The MAC header includes fields of Frame Control, Duration, Address 1, Address 2, Address 3, Sequence Control, Address 4, QoS Control, HT (High Throughput) control, and MU-MC information. A destination address (Receiver Address; RA) is set in the field of Address 1. A transmission source address (Transmitter Address; TA) is set in the field of Address 2. A BSSID (Basic Service Set Identifier) (in some case, a wildcard BSSID targeting all BSSIDs by setting 1 in all bits), which is an identifier of a BSS, or a TA is set in the field of Address 3 according to a use of the frame. The field of Address 4 is used, for example, in the case of communication between base stations.

Figure 5:
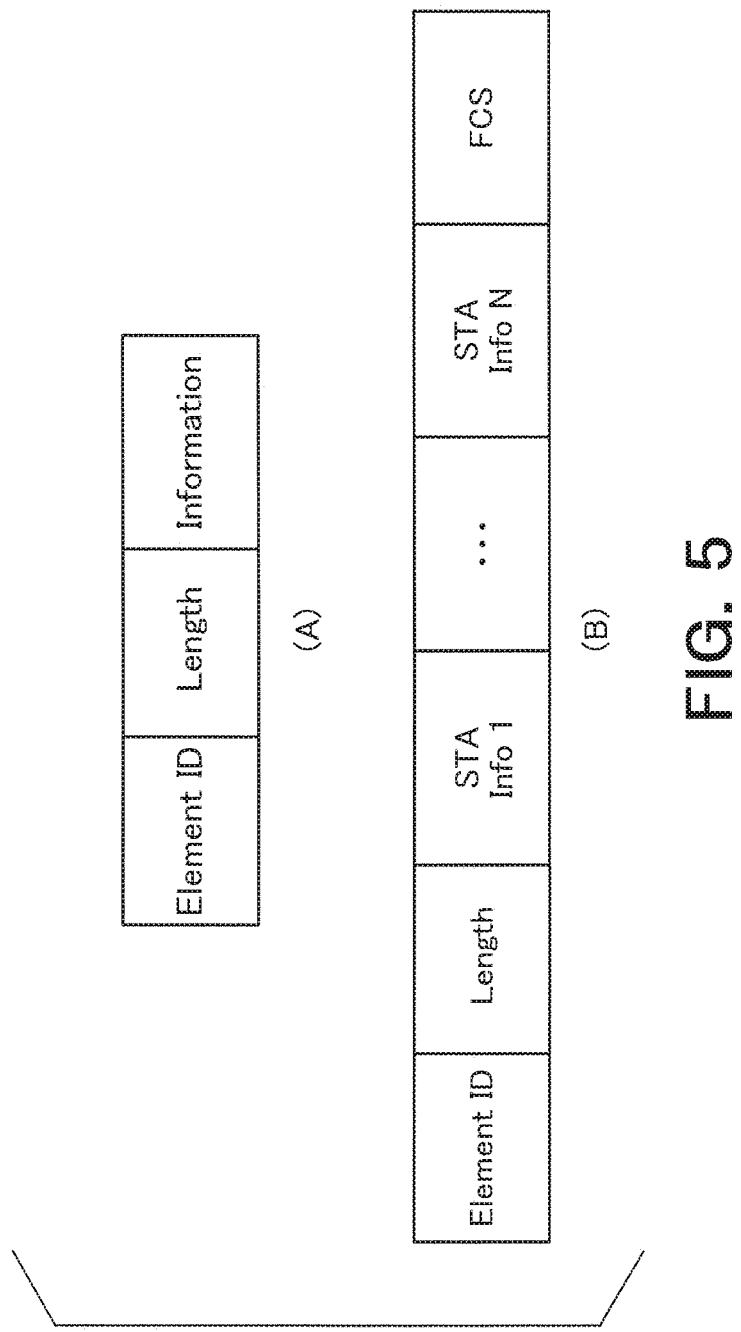
FIG. 5 shows diagrams showing a format example of information elements.

In the management frame, information inserted into the frame body is managed as an information element. A format example of the information element is shown in FIG. 5(A). The information element includes an Element ID field, a Length field, and an Information field. A value for identifying the information element is stored in the Element ID field. Information to be notified is stored in the Information field (hereinafter, information field). Length information of the information field is stored in the Length field. In the frame body field, one or a plurality of the information element having such a configuration can be stored.

An MU-MC information field is a field for notifying presence or absence of a start of the MU-MC communication and is a field defined anew in this embodiment. As an example, a bit "1" is set when the start of the MU-MC communication is notified and a bit "0" is set otherwise. A frame of the bit "1" is equivalent to the start notification frame. Meanings of the bits may be opposite. When the start of the MU-MC communication is notified, information for specifying a terminal set as a target of the MU-MC communication (terminal specifying information) is set in the frame body field. Specifically, a new information element for the start notification of the MU-MC communication is defined. The terminal specifying information is notified by the information element. The information element is referred to as MU-MC communication start notification element. A new number is given to the information element for an Element ID.

A format example of the MU-MC communication start notification element is shown in FIG. 5(B). In the Information field, terminal specifying information of one or a plurality of terminals (in the figure, N terminals are designated by STA info 1 to STA Info N fields) is set. The terminal specifying information may be an association ID (AID), may be a MAC address, or may be other values capable of uniquely distinguishing the terminals. The AID is an ID allocated by the base station when the terminals are allocated to the base station. The AID is notified to the terminals beforehand by an association response frame or the like. A group ID may be used as the terminal specifying information. In this case, it is assumed that the base station groups the terminals at an association time with the terminals or any timing after the association time and notifies group IDs of groups respectively belonging to the terminals. In addition to the terminal specifying information, information for specifying channels that the base station causes the terminals to use may be added to the STA Info 1 to STA Info N fields. Another information element may be defined. The information for specifying the channels may be notified by the information element or may be notified by other methods.

Figure 6:
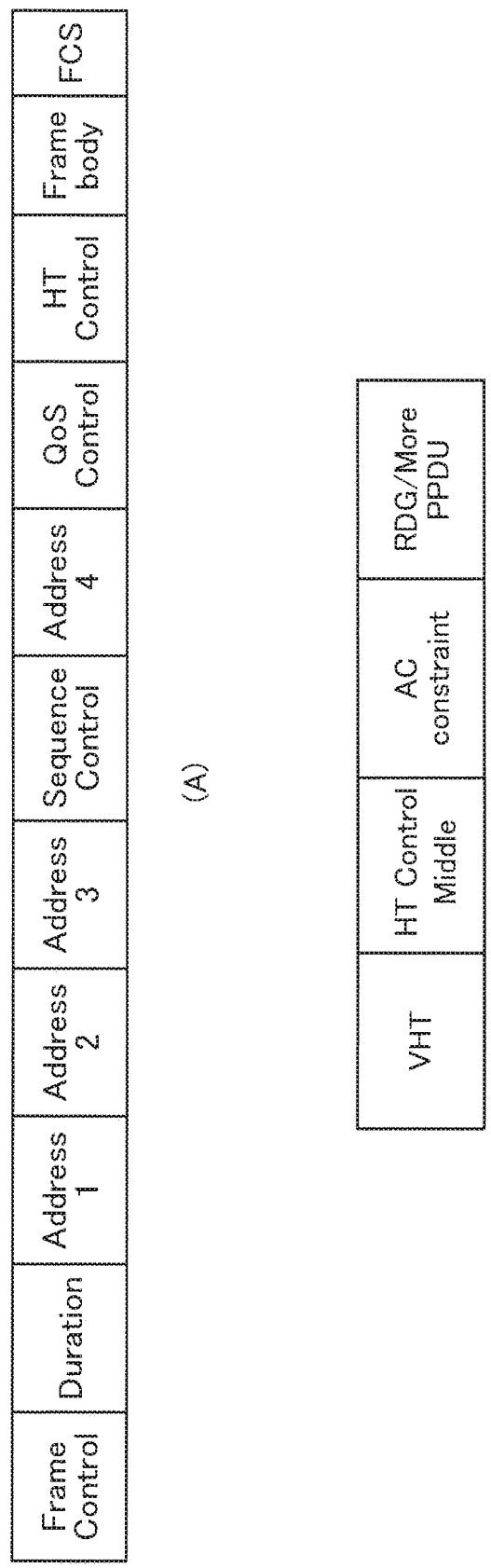
FIG. 6 shows diagrams showing another format example of the frame and a format example of an HT Control field in the embodiment.

Besides notifying the start of the MU-MC communication using the MU-MC Information field shown in FIG. 4, it is also possible to notify the start of the MU-MC communication using a frame format in which the MU-MC information field is absent. This frame format is shown in FIG. 6(A). The start of the MU-MC communication may be notified using, for example, a null bit (a bit in a Reserved field) of an HT Control field of the frame format. A format example of the HT Control field is shown in FIG. 6B. As an example, the start of the MU-MC communication can be notified using a bit in a null field of an HT control Middle subfield.

Figure 7:
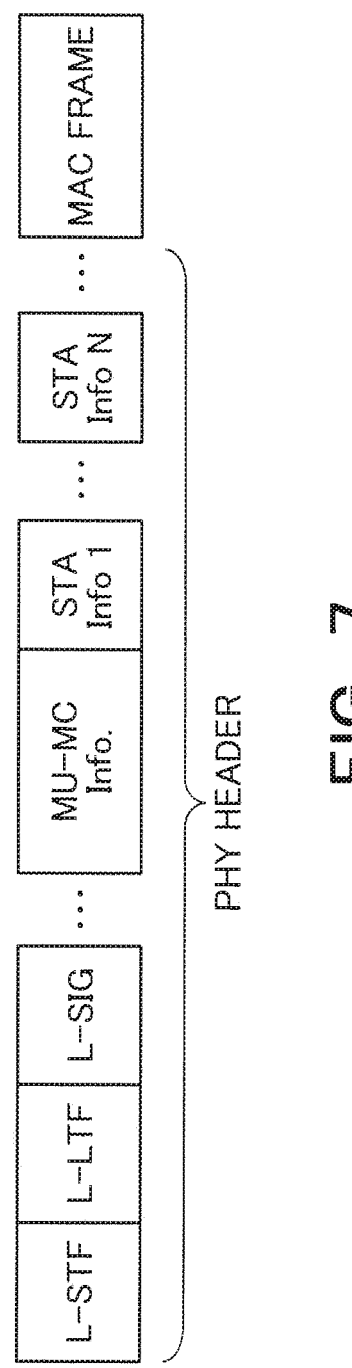
FIG. 7 shows a schematic configuration example of a physical header.

In the example explained with reference to FIGS. 4 to 6B, the start of the MU-MC communication, the designation of the terminal, and the like are performed using the MAC header and the body field of the MAC frame. However, it is also possible to use a physical header (PHY header) added to the head side of the MAC frame. As shown in FIG. 7, an MU-MC Information field and terminal specifying information fields (STA Info 1 to STA Info N) for a plurality of terminals are disposed in the physical header. The PHY header includes, in addition to these fields, an L-STF (Legacy-Short Training Field), an L-LTF (Legacy-Long Training Field), and an L-SIG (Legacy Signal Field). The L-STF, L-LTF, and L-SIG are fields capable of recognizing terminals of legacy standards such as IEEE802.11a. Information such as signal detection, frequency correction, and transmission speed are stored in the fields.

Several examples of an operation sequence related to the MU-MC communication between a base station and a plurality of terminals are explained with reference to FIGS. 8 to 11.

Figure 8:
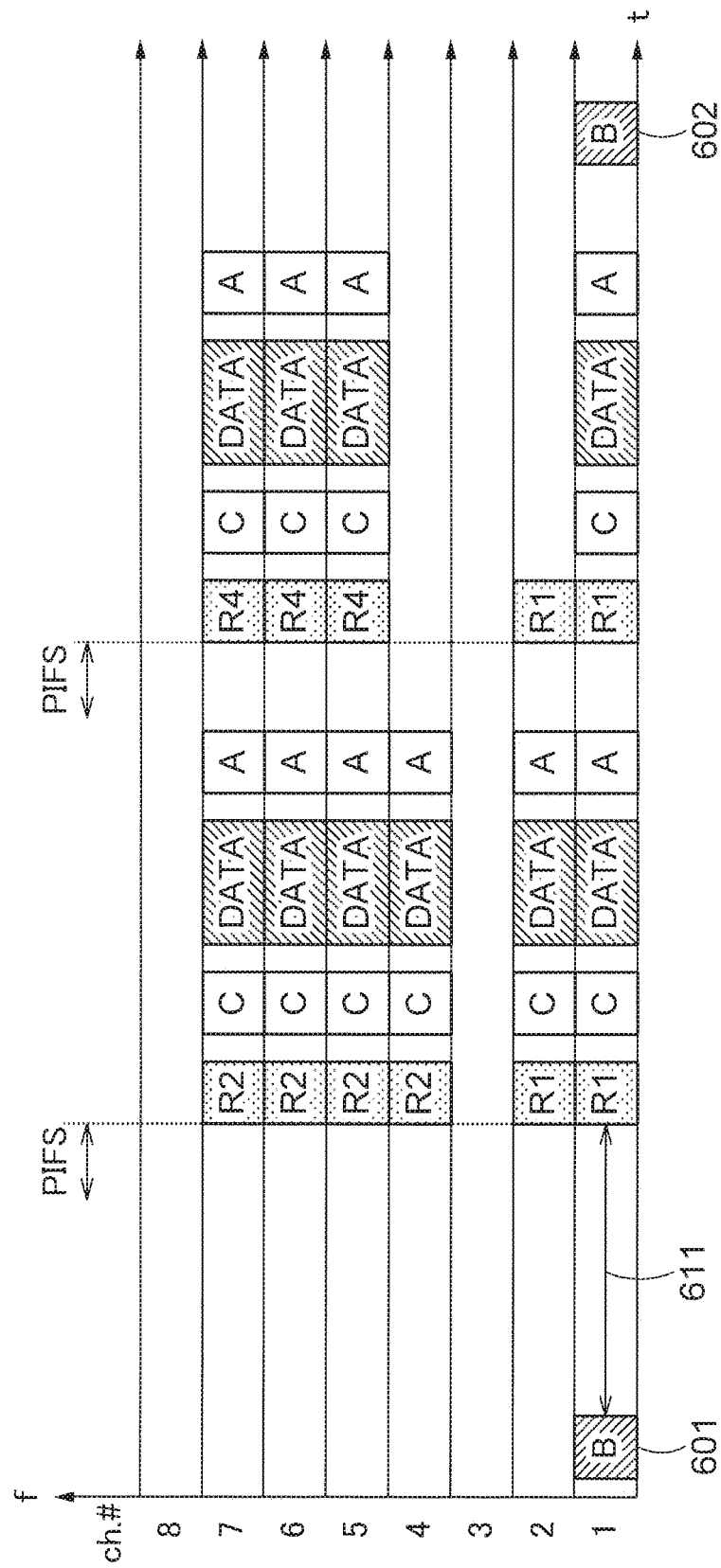
FIG. 8 is a diagram showing an example of an operation sequence of a base station and a plurality of terminals.

FIG. 8 shows an example of the operation sequence of the base station and the plurality of terminals. The base station includes data addressed to terminals 1, 2, and 4. The operation sequence is a sequence in transmitting the data using the MU-MC communication. The horizontal axis represents time and the vertical axis represents channels 1 to 8. The terminals 1, 2, and 4 are capable of executing the MU-MC communication. The function of the MU-MC communication is enabled (on) in the terminals 1, 2, and 4.

Hatched rectangles mean frames transmitted by the base station. White rectangles mean frames transmitted by the terminals other than the base station. Rectangles with "B" represent beacon frames. Rectangles with "R" represent RTS frames. The numerals on the right side of "R" represent terminal numbers at destinations of the RTS frames. For example, "R1" represents the RTS frame addressed to the terminal 1. "C" represents a CTS frame. "DATA" represents a data frame. "A" represents an ACK frame (an acknowledgement response frame).

Note that, when the base station transmits a plurality of frames to the plurality of terminals, the plurality of frames to be transmitted may be the same or may be different. When the base station is represented as transmitting or receiving a plurality of frames or a plurality of X-th frames as general representation, the frames or the X-th frames may be the same or may be different. Any value can be set in X according to a situation.

The base station transmits a beacon frame at a fixed cycle. When the base station performs the MU-MC communication, the base station notifies a start of the MU-MC communication using the beacon frame as the start notification frame. In the example shown in the figure, the base station notifies a start of an MU-MC validity period with a beacon frame 601. Information representing the start of the MU-MC communication and information for specifying terminals that perform the MU-MC communication (terminal specifying information) are included in the beacon frame 601. Since the terminals 1, 2, and 4 are targets of the MU-MC communication, the beacon frame 601 includes information for specifying the terminals 1, 2, and 4. Information designating channels used by the terminals 1, 2, and 4 in the MU-MC communication may be included in the beacon frame 601. The information is included in the beacon frame 601. In this example, the channels 1 and 2 are designated for the terminal 1, the channels 4 to 7 are designated for the terminal 2, and the channels 5 to 7 are designated for the terminal 4. The terminals receive the beacon frame 601, analyze the beacon frame 601, and grasp a start time and an end time of the MU-MC validity period. In this example, it is assumed that the start time is decided beforehand as a time after fixed time from reception of the beacon frame. The terminals determine that a period of a beacon interval from the beacon frame 601 until reception of the next beacon frame 602 is the MU-MC validity period. That is, the terminals grasp that an end time of the beacon interval is the end time of the MU-MC validity period. It is assumed that this is recognized in common beforehand by the base station and the terminals.

The base station stays on standby for a period 611, which is predetermined time or time having length equal to or longer than the predetermined time, from the transmission of the beacon frame 601 and detects arrival of the start time. In order to perform the MU-MC communication with the terminals 1 and 2 among the terminals 1, 2, and 4, the base station transmits the RTS frames in the channels 1 and 2 corresponding to the terminal 1 and the channels 4 to 7 corresponding to the terminal 2. In this case, the base station performs, in the channels 1, 2, and 4 to 7, carrier sensing between a DIFS and back-off time determined at random and confirms that a carrier sensing result is idle to acquire an access right, that is, time in which a medium can be occupied (TXOP). A destination address (RA) of the RTS frames transmitted to the terminal 1 is a MAC address of the terminal 1. A transmission source address (TA) of the RTS frames is a MAC address of the base station. Both of the RTS frames transmitted in the channels 1 and 2 are frames having the same content (Duplicate frames). Transmission of the frames having the same content is sometimes referred to as Duplicate transmission. A destination address of the RTS frame transmitted to the terminal 2 is a MAC address of the terminal 2. A transmission source address of the RTS frame is the MAC address of the base station. The RTS frames transmitted in the channels 4 to 7 are the Duplicate frames.

It is assumed that the terminals connected to the base station are performing the standby operation in the channel 1, which is the primary channel, during normal operation and the channels 2 to 8 are turned off to reduce power consumption. When the transmission and reception processors (see FIG. 2) are present for the respective channels, for example, the transmission and reception processor corresponding to the channel 1 may be turned on (ON) and the other transmission and reception processors may be turned off (OFF). When a plurality of channels are covered by one transmission and reception processor, an analog filter may be set to cover a band of the channel 1 and block bands of the other channels. For example, the operation of the analog filter is set in a center frequency of the filter and a range from the center frequency, the center frequency only has to be set to a center frequency of the channel 1 and the range only has to be set to a value corresponding to the width of the channel 1. When all the channels are covered by one analog filter and the respective channels are processed by digital filters, the digital filters for the channels other than the channel 1 only have to be stopped. Consequently, a reduction in power consumption can be achieved by eliminating operation for performing reception processing such as demodulation of frames of the channels other than the channel 1.

In order to change the channels for the standby operation, as explained above, the terminals need the setup time. The terminals 1, 2, and 4 respectively receive beacon frames 601 and analyze the beacon frames 601. Consequently, the terminals 1, 2, and 4 detect that the own terminals are designated as targets of the MU-MC communication and detect channels designated for the own terminals as channels for the MU-MC communication. The terminals 1, 2, and 4 respectively switch the standby operation channels to the channels for the MU-MC communication. That is, the terminal 1 sets the channels 1 and 2 as the standby operation channels. The terminal 2 sets the channels 4 to 7 as the standby operation channels. The terminal 4 sets the channels 5 to 7 as the standby operation channels. Note that the channel 1, which is the primary channel, may be always set as the operation channel. The standby operation may be performed in the channel 1.

Time until the start time of the MU-MC validity period after the transmission of the beacon frame 601 by the base station (time in which the base station stays on standby until the base station is enabled to transmit the RTS frames to the terminals 1 and 2) is set to the longest time among the set up times of the terminals that perform the MU-MC communication or time longer than the longest time.

Note that the base station may secure a TXOP (an access right) at least during the predetermined time using the Duration field of the beacon frame 601 such that the RTS frames in the channel 1, which is the primary channel, can be surely transmitted after standby for the predetermined time.

The terminals 1 and 2 receive the RTS frame transmitted from the base station and transmit CTS frames in channels in which a carrier sensing result is idle for fixed time (PIFS) before the reception. The terminal 1 receives the RTS frames in the channels 1 and 2 and the carrier sensing result is idle for the fixed time (PIFS) before the reception. Therefore, the terminal 1 transmits the CTS frames in the channels 1 and 2. The terminal 2 receives the RTS frames in the channels 4 to 7 and the carrier sensing result is idle for the fixed time (PIFS) before the reception. Therefore, the terminal 2 transmits the CTS frames in the channels 4 to 7. Note that, if there is a channel in which the RTS frame cannot be received or a channel that is busy for the PIFS time before the reception, the CTS frame is not returned in the channel. A destination address (RA) of the CTS frames transmitted from the terminals 1 and 2 is the MAC address of the base station. Note that, since the terminal 4 is performing the standby operation in the channels 5 to 7, the terminal 4 can receive the RTS frames transmitted from the base station in the channels 5 to 7. However, since a destination of the RTS frames is the terminal 2, the terminal 4 determines that the RTS frames are not frames addressed to the own terminal and discards the RTS frames.

After elapse of an SIFS from reception completion of the CTS frames, the base station transmits data frames in the channels in which the CTS frames are received. The base station receives the CTS frames respectively in the channels 1 and 2 from the terminal 1 and receives the CTS frames in channels 4 to 7 from the terminal 2. Therefore, the base station simultaneously transmits data frames to the terminal 1 in the channels 1 and 2 and to the terminal 2 in the channels 4 to 7. It is assumed that the length of time for transmitting the data frames is determined beforehand. A plurality of frames may be transmitted or an aggregation frame (a super frame) including a plurality of data frames may be transmitted. Data frames may be separately transmitted in the channels 1 and 2. One or a plurality of frames or the aggregation frame may be transmitted to the terminal by binding and using the channels 1 and 2 as one band. Similarly, one or a plurality of data frames may be transmitted to the terminal 2 by binding and using the channels 4 to 7 as one band. A transmission source address (TA) of the data frames transmitted to the terminal 1 is the MAC address of the base station. A destination address (RA) of the data frames is the MAC address of the terminal 1. A transmission source address (TA) of the data frames transmitted to the terminal 2 is the MAC address of the base station. A destination address (RA) of the data frames is the MAC address of the terminal 2.

The terminals 1 and 2 determine on the basis of FCSs of the data frames received from the base station whether the reception is successful and return ACK frames in channels in which the reception is successful. The terminal 1 has succeeded in the reception of the data frames in both of the channels 1 and 2. Therefore, the terminal 1 returns ACK frames in the respective channels 1 and 2. The terminal 2 has succeeded in the reception of the data frames in all of the channels 4 to 7. Therefore, the terminal 2 returns ACK frames in the respective channels 4 to 7. For example, when the aggregation frame is received, the terminals 1 and 2 transmit BA (Block ACK) frames instead of the ACK frames.

After the MU-MC communication with the terminals 1 and 2 is completed, subsequently, in order to perform the MU-MC communication with the terminals 1 and 4, the base station transmits RTS frames to the terminal 1 in the channels 1 and 2 and transmits RTS frames to the terminal 4 in the channels 5 to 7. As explained above, before the transmission, the base station acquires a TXOP on the basis of carrier sensing between a DIFS and a back-of time. The terminal 1 receives the RTS frames in the channels 1 and 2. However, it is assumed that a carrier sensing result for a PIFS before the reception of the RTS frame is idle in the channel 1 and is busy for the PIFS before the reception of the RTS frame. Therefore, the terminal 1 transmits a CTS frame to the base station only in the channel 1. The terminal 4 receives RTS frames in the respective channels 5 to 7 and all the channels are idle for the PIFS before the reception. Therefore, the terminal 4 transmits CTS frames in the respective channels 5 to 7. Note that the terminal 2 can receive RTS frames in the channels 5 to 7. However, since a destination of the RTS frames is the terminal 4, the terminal 2 determines that the RTS frames are not frames addressed to the own terminal and discards the RTS frames.

The base station receives a CTS frame from the terminal 1 in the channel 1 and receives CTS frames from the terminal 4 respectively in the channels 5 to 7. Therefore, the base station simultaneously transmits a data frame to the terminal 1 in the channel 1 and data frames to the terminal 2 in the channels 5 to 7. A plurality of data frames may be transmitted or an aggregation frame including a plurality of data frames may be transmitted. Data frames may be separately transmitted to the terminal 2 in the channels 5 to 7. One or a plurality of data frames or an aggregation frame may be transmitted by binding and using the channels 5 to 7 as one band.

The terminals 1 and 4 determine on the basis of FCSs of the data frames received from the base station and return ACK frames in channels in which the reception is successful. The terminal 1 has succeeded in the reception of the data frame. Therefore, the terminal 1 returns the ACK frame in the channel 1. The terminal 4 has succeeded in the reception of the data frames in all of the channels 5 to 7. Therefore, the terminal 4 returns the ACK frames in the respective channels 5 to 7. For example, when the aggregation frame is received, the terminals 1 and 4 transmit BA (Block ACL) frames instead of the ACK frames.

Thereafter, the base station transmits the next beacon frame 602. The MU-MC validity period ends at an end time of a beacon interval immediately before the transmission of the beacon frame 601. The terminals designated as the targets of the MU-MC communication in the beacon frame 601 reset the standby operation channels to the original channel (the channel 1) according to the end of the beacon interval starting in the beacon frame 601. However, when information notifying the start of the MU-MC communication again is included in the beacon frame 602 and the own terminals continue to be designated, if there is no change in the standby operation channels, the terminals may maintain the present channel without resetting the standby operation channels to the original channel.

Figure 9:
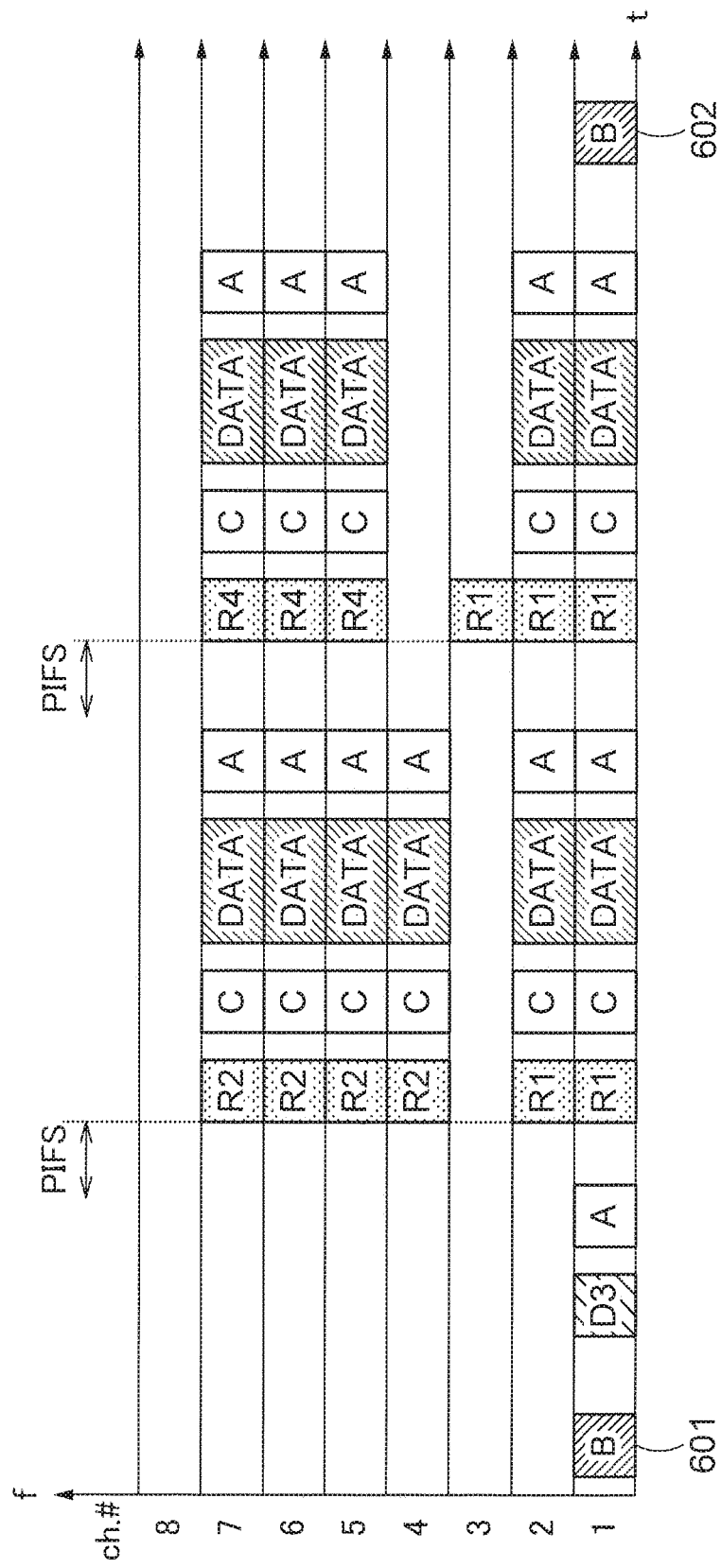
FIG. 9 is a diagram showing another example of the operation sequence of the base station and the plurality of terminals.

In the sequence shown in FIG. 8, the base station stays on standby in the period 611 after the transmission of the beacon frame 601. However, the base station may perform other communication in the period. A sequence example of the communication is shown in FIG. 9. FIG. 9 is different from FIG. 8 in that the base station performs unicast communication with the terminal 3 after transmission of the beacon frame 601 and before a start of the MU-MC validity period (before transmission of the RTS frames). It is assumed that the terminal 3 is not designated as a target of the MU-MC communication in the beacon frame 601 and is caused to perform the standby operation only in the channel 1.

After transmitting the beacon frame 601, the base station performs carrier sensing, acquires an access right, and transmits a data frame to the terminal 3. "D3" represents the data frame addressed to the terminal 3. The base station performs the carrier sensing for fixed time and back-off time and, if a carrier sensing result is idle, acquires the access right and transmits the data frame. The fixed time is a DIFS, an AIFS, or the like but may be other values. After transmitting the data frame, the base station receives an ACK frame from the terminal 3 after an SIFS. Thereafter, when a start time of the MU-MC validity period arrives, as in FIG. 8, the base station transmits RTS frames to the terminal 1 in the channels 1 and 2 and transmits RTS frames to the terminal 2 in the channels 4 to 7. Consequently, it is possible to effectively use standby time until the MU-MC communication is actually started. It is possible to improve system efficiency.

The base station performs the terminal 3 not designated in the beacon frame 601. However, the base station can also perform communication with at least one of the terminals 1, 2, and 4 designated in the beacon frame 601 if the terminals are performing the standby operation in the channel 1. The base station may perform broadcast communication or multicast communication rather than the unicast communication. The base station performs communication in the channel 1, which is the primary channel, for the standby time. However, if a terminal performing the standby operation in another channel is present, the base station may perform communication in the other channel.

Figure 10:
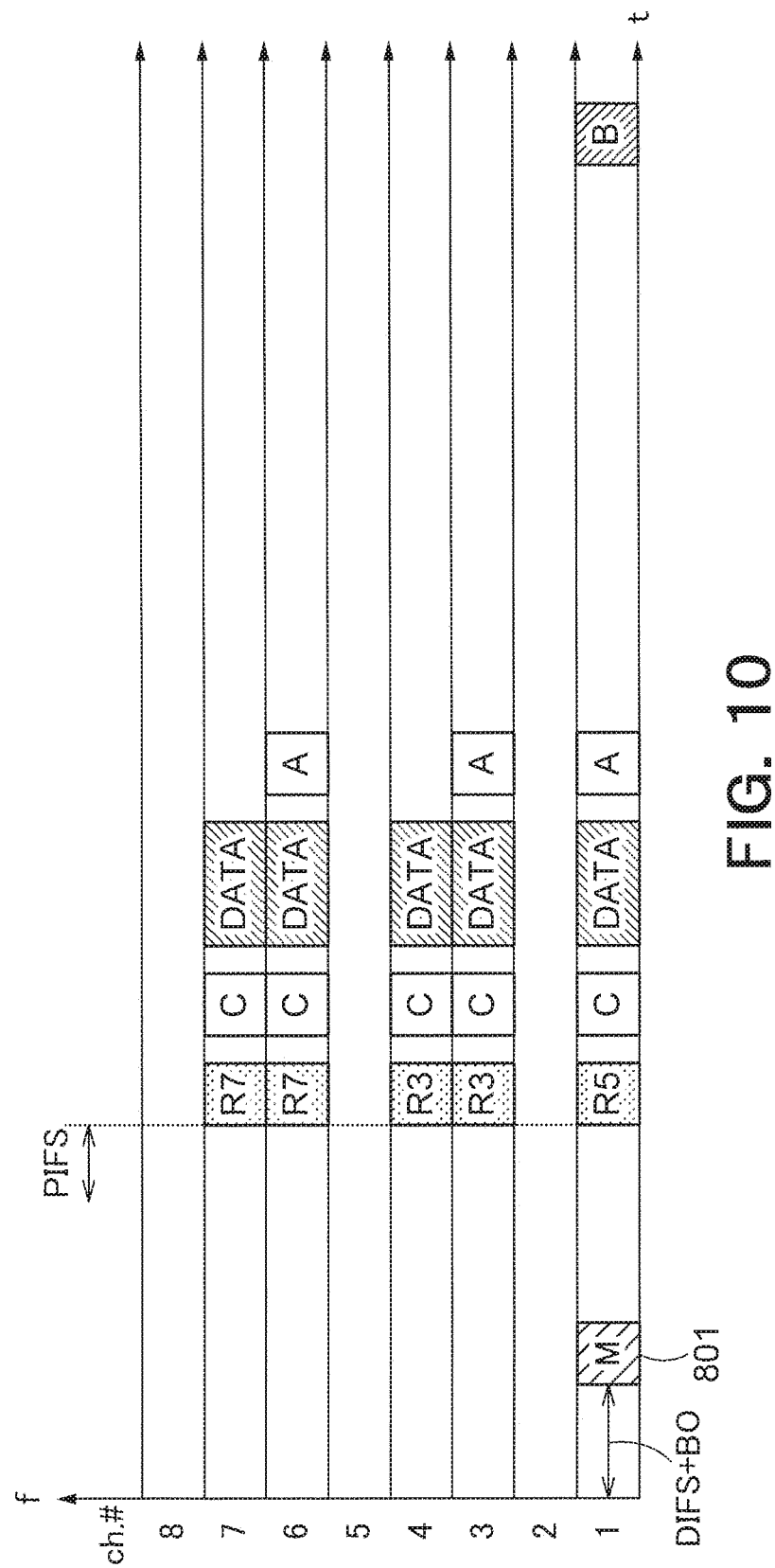
FIG. 10 is a diagram showing still another example of the operation sequence of the base station and the plurality of terminals.

In the above explanation, the start notification of the MU-MC communication, the designation of the terminal set as the target of the MU-MC communication, and the like are performed using the beacon frame. A sequence in which a separately defined dedicated management frame is used rather than the beacon frame is explained. In FIG. 10, an example of an operation sequence in which a management frame defined anew is used is shown. A rectangle with "M" represents the management frame. Note that it is possible to distinguish according to values of a type and a sub-type of a Frame Control field whether, for example, the management frame is the beacon frame or the separately defined new management frame.

As shown in FIG. 10, when determining execution of the MU-MC communication, the base station transmits a management frame 801 for notifying a start of the MU-MC communication. The management frame performs carrier sensing between a DIFS and back-off time and, if a carrier sensing result is idle, acquires an access right and transmits the management frame 801. Note that, in the case of the beacon frame explained above, the base station performs similar carrier sensing, acquires an access right, and transmits the beacon frame.

Information for specifying a terminal designated as a target of the MU-MC communication (terminal specifying information) is included in the management frame 801. Further, information for specifying channels that the base station causes the terminals to use may be included in the management frame 801. The base station designates the terminals 5, 3, and 7 and designates the channels 1, 3 to 4, and 6 to 7 respectively for the terminals 5, 3, and 7. Since the management frame 801 itself has a function of notifying the start of the MU-MC communication, a field for notification like the MU-MC information field shown in FIG. 4 does not have to be included in the management frame 801. However, the field for notification may be explicitly included in the management frame 801. As explained above, the terminal specifying information may be an AID (Association ID), may be a MAC address, or may be a group ID. When the group ID is used, for example, a group ID of a group to which the terminals 5, 3, and 7 belong in common is included in the management frame 801. There is an advantage that it is possible to further reduce information size than when the AID, the MAC address, or both of the AID and the MAC address are designated for the respective terminals.

In the management frame 801, as in the beacon frame, information for specifying a start time or an end time of the MU-MC validity period may be included. The start time or the end time may be determined beforehand in a system or a standard without including information for explicitly specifying the start time or the end time in the management frame 801. For example, a period from immediately after the transmission of the management frame 801 to before the transmission of the next beacon frame may be defined as the MU-MC validity period. The MU-MC validity period may be defined by any method if the MU-MC validity period is recognized in common between the base station and the terminals beforehand.

The terminals 5, 3, and 7 receive and analyze the management frame 801 transmitted from the base station to recognize that the own terminals are designated as targets of the MU-MC communication. The terminals 5, 3, and 7 switch the standby operation channels to channels for the MU-MC communication. Since the channel 1, which is the primary channel, is a channel for the MU-MC communication, the terminal 5 maintains the present channel. The terminal 3 switches the standby operation channels to the channels 3 and 4. The terminal 7 switches the standby operation channels to the channels 6 and 7. Note that the base station only has to cause the terminals 3 and 7 to continue the standby operation concerning the channel 1, which is the primary channel.

After staying on standby for predetermined time that takes into account channel setup times in the terminals 5, 3, and 7, the base station transmits RTS frames respectively in the terminals 5, 3, and 7 in the channels 1, 3 to 4, and 6 to 7. The terminals 5, 3, and 7 receive the RTS frames respectively in the channels 1, 3 to 4, and 6 to 7. Carrier sensing is idle in all of the channels 1, 3 to 4, and 6 to 7 for a PIFS before reception. Therefore, the terminals 5, 3, and 7 return CTS frames respectively in the channels 1, 3 to 4, and 6 to 7.

The base station receives the CTS frames from the terminals 5, 3, and 7 in the channels 1, 3 to 4, and 6 to 7. Therefore, the base station simultaneously transmits data frames to the terminals 5, 3, and 7 in the channels 1, 3 to 4, and 6 to 7. The terminal 1 normally receives the data frame from the base station in the channel 1 and returns an ACK frame. The terminal 3 normally receives the data frame in the channel 3 of the channels 3 and 4 and fails in the reception in the channel 4. Therefore, the terminal 3 returns an ACK frame only in the channel 3. The terminal 7 normally receives the data frame in the channel 6 of the channels 6 and 7 and fails in the reception in the channel 7. Therefore, the terminal 7 returns an ACK frame only in the channel 3.

Note that, as in the case of the sequence example in which the beacon frame is used, a plurality of channels may be bound and used as one band. An aggregation frame including a plurality of data frames may be transmitted. BA frames may be used instead of the ACK frames.

Figure 11:
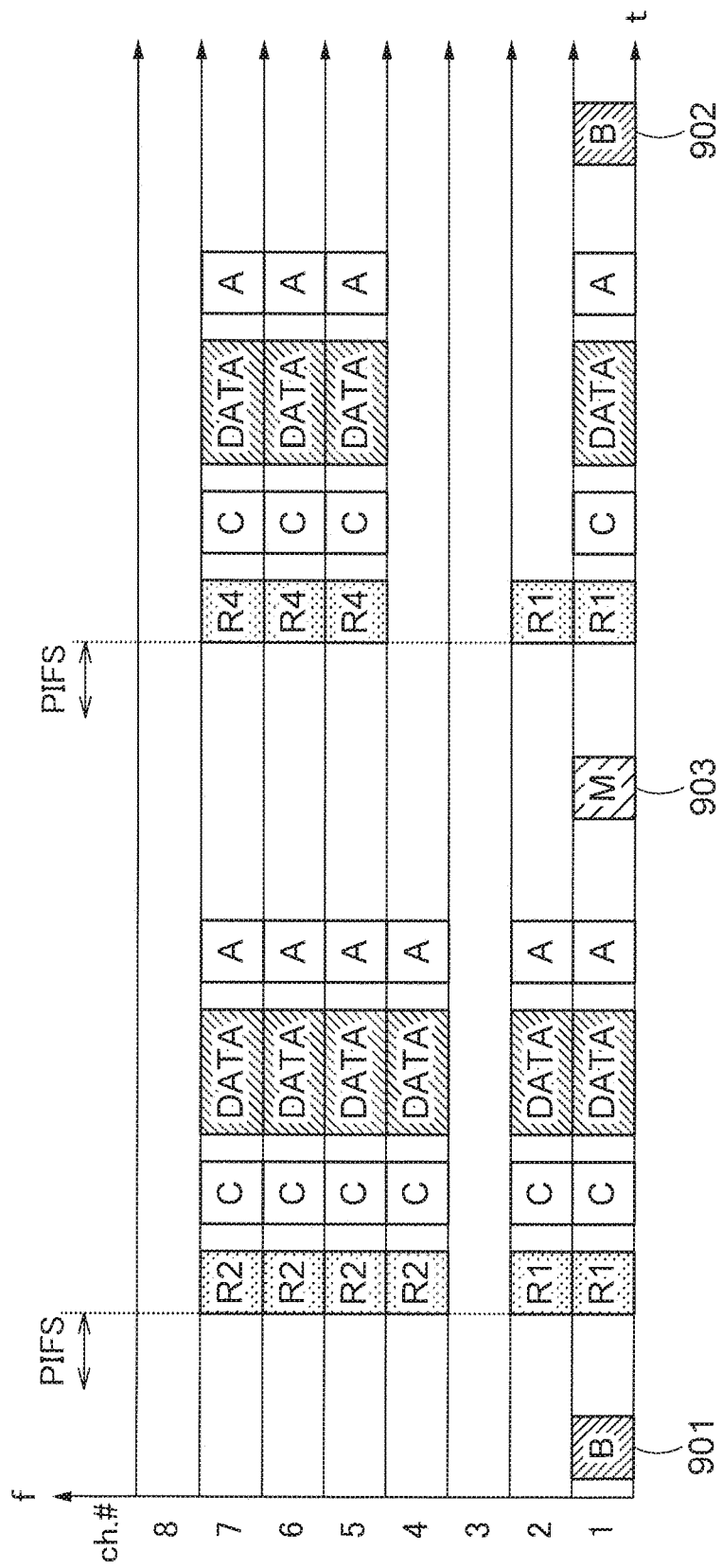
FIG. 11 is a diagram showing still another example of the operation sequence of the base station and the plurality of terminals.
Figure 12:
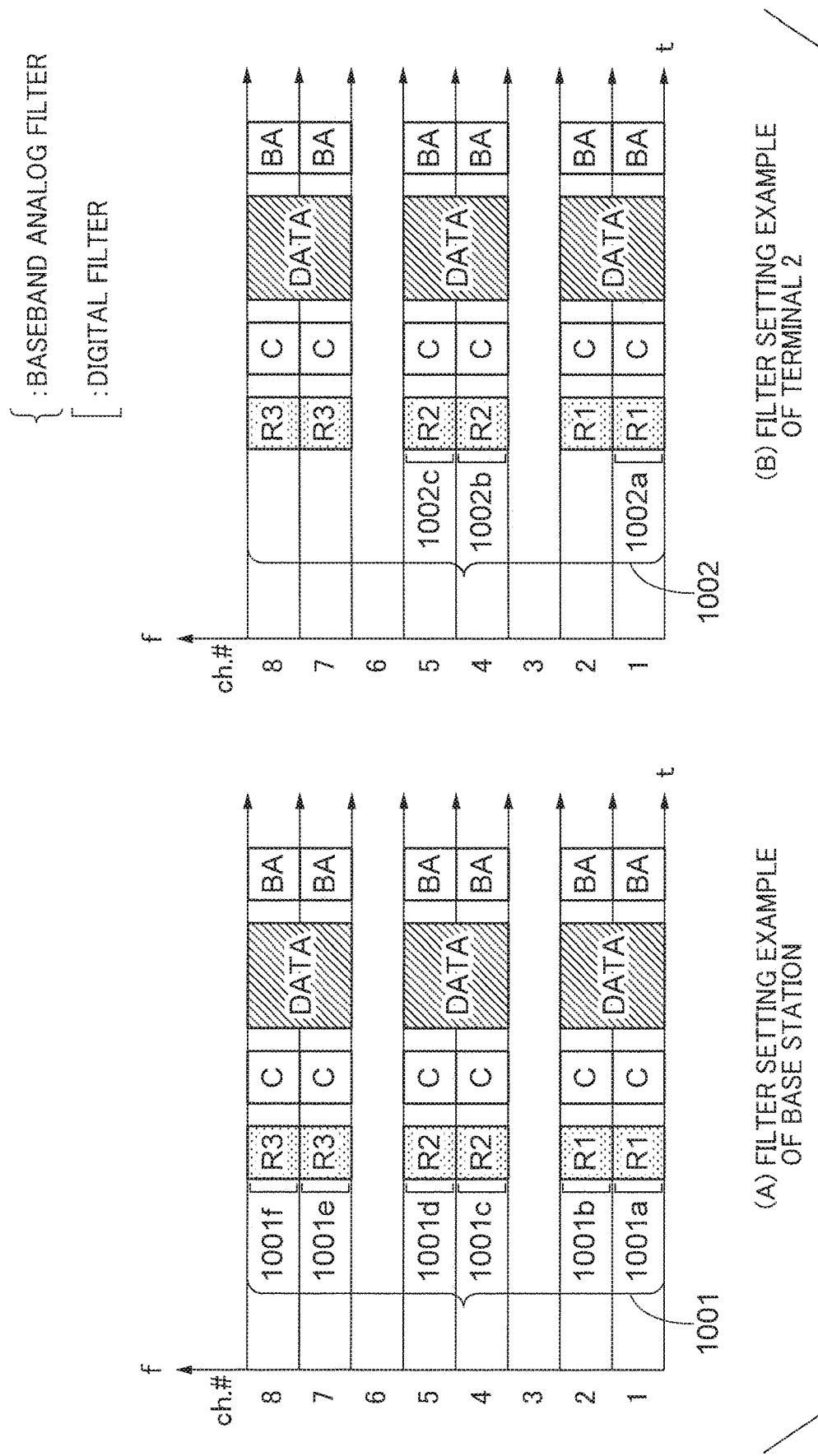
FIG. 12 shows diagrams showing filter setting examples of the base station and the terminal.
Figure 13:
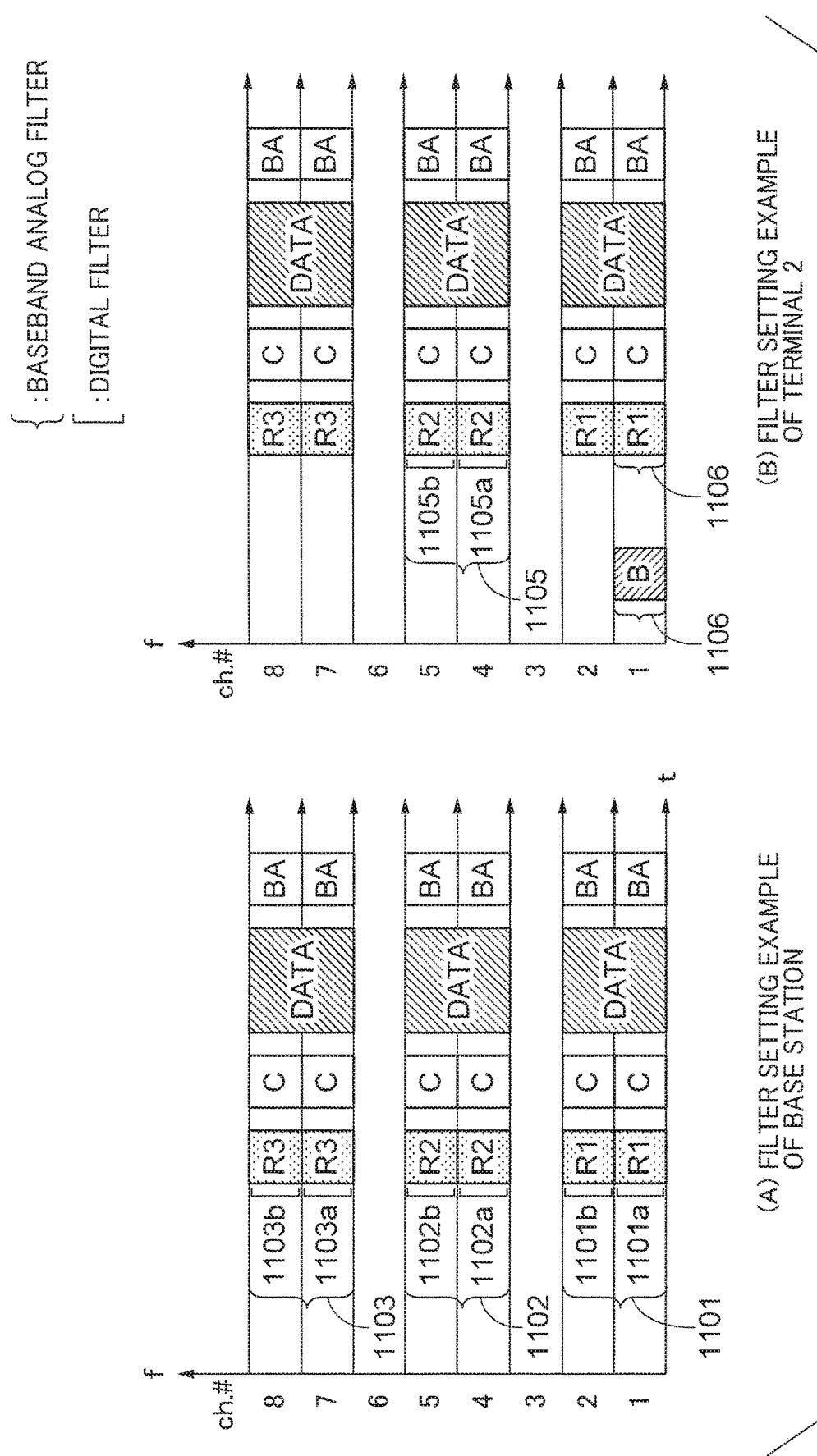
FIG. 13 shows diagrams showing other filter setting examples of the base station and the terminal.
Figure 14:
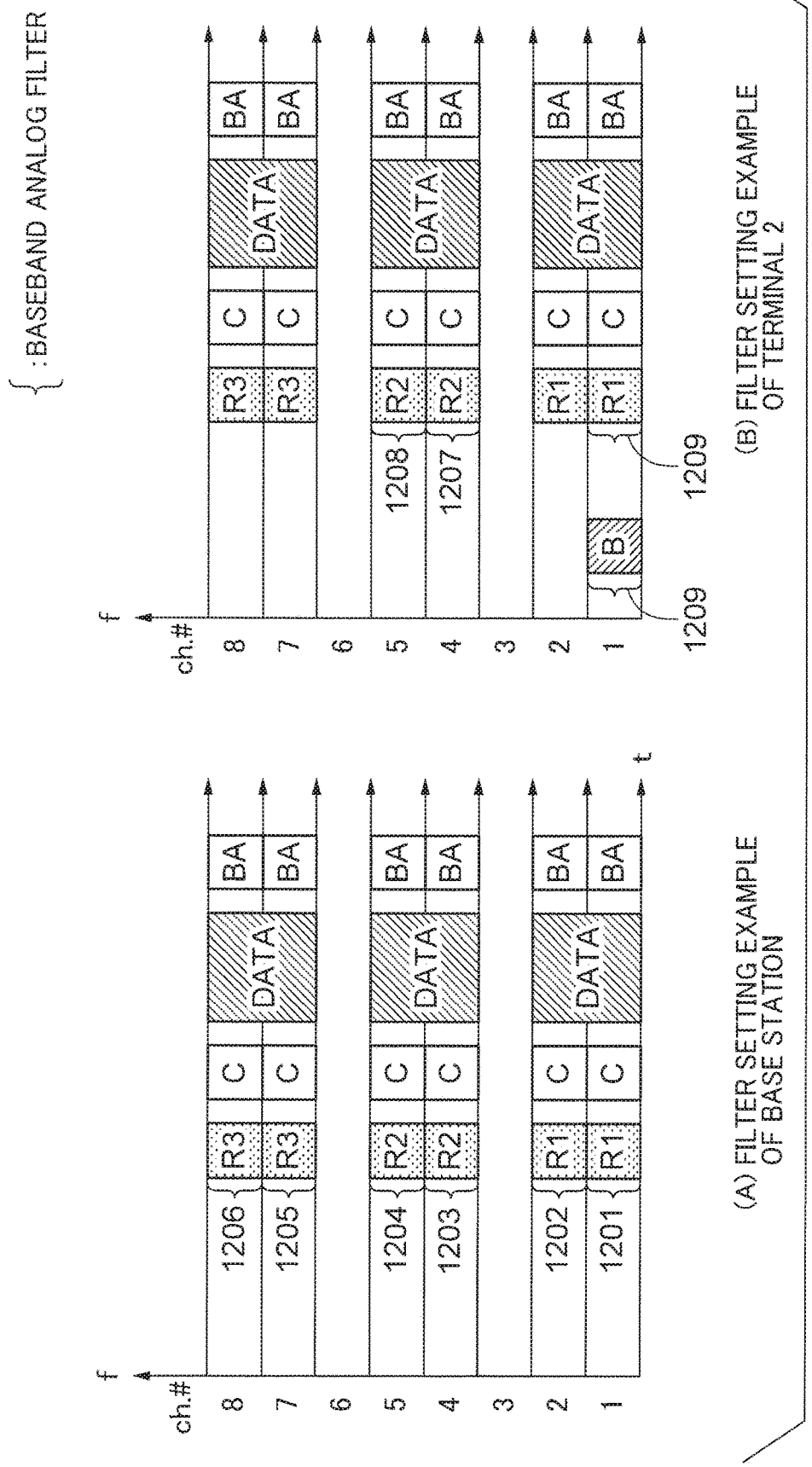
FIG. 14 shows diagrams showing still other filter setting examples of the base station and the terminal.
Figure 15:
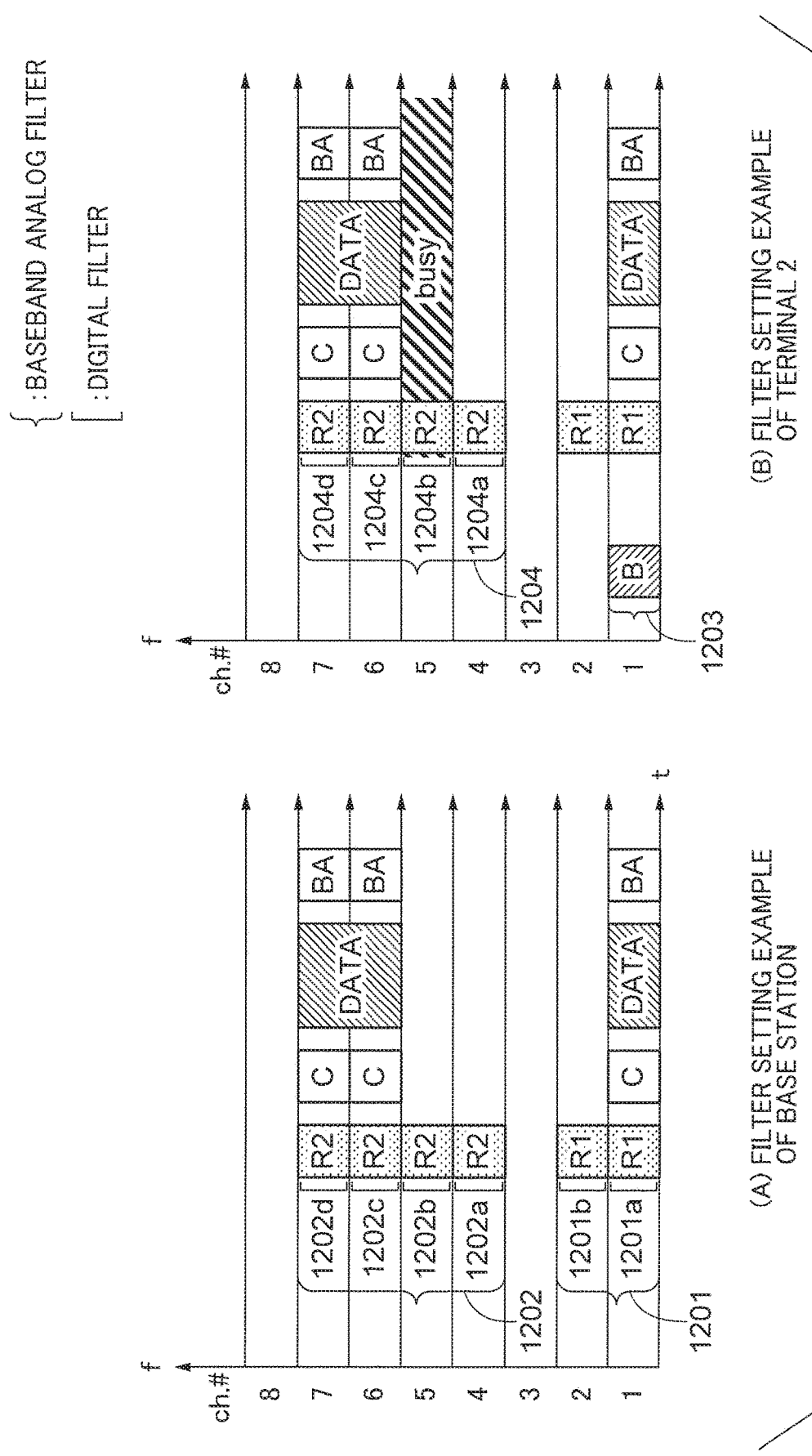
FIG. 15 shows diagrams showing still other filter setting examples of the base station and the terminal.
Figure 16:
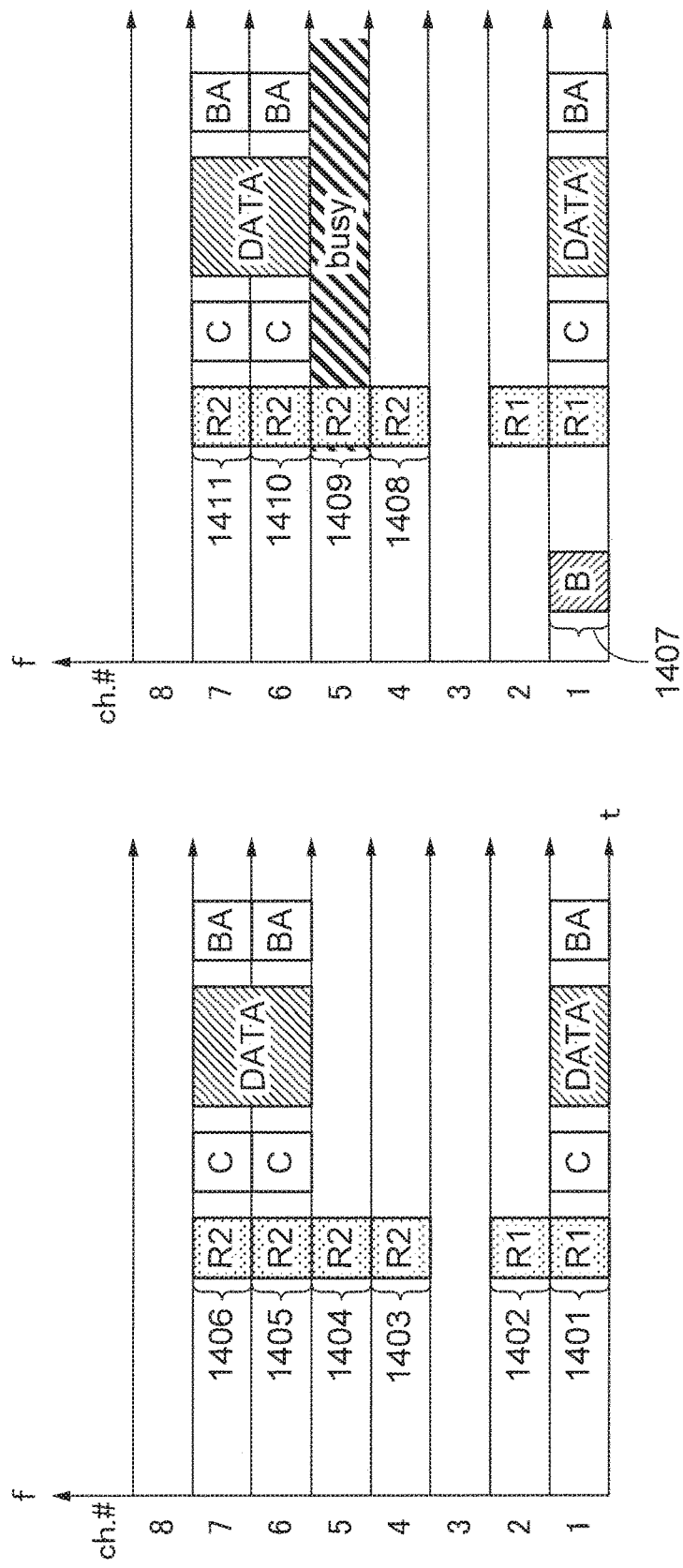
FIG. 16 shows diagrams showing still other filter setting examples of the base station and the terminal.

FIG. 11 shows an operation sequence example in which both of a beacon frame and a management frame are combined to control the MU-MC communication.

First, the base station transmits a beacon frame 901 in the channel 1, which is the primary channel, to notify a start of the MU-MC communication. In the beacon frame 901, the base station designates the terminals 1 and 2 as targets of the MU-MC communication. After staying on standby for a predetermined period that takes into account setup times in the terminals 1 and 2, the base station transmits RTS frames to the terminals 1 and 2 respectively in the channels 1 and 2 and 4 to 7. Thereafter, a sequence from reception of RTS frames in the terminals 1 and 2 to transmission and reception of CTS frames, data frames, and ACK frames is the same as the sequence example shown in FIG. 11.

After the communication with the terminals 1 and 2, in order to perform the MU-MC communication with the terminals 1 and 4, the base station transmits a management frame 903 halfway in the present beacon interval. In the management frame 903, the base station designates the terminals 1 and 4 as targets of the MU-MC communication. Since the terminal 1 is already designated in the beacon frame 901, the designation may be omitted in the management frame 901 (e.g., when an MU-MC validity period notified in the beacon frame 901 is validity before transmission of the next beacon frame 902).

The base station may regard the MU-MC validity period by a beacon frame (or another management frame) before transmission of the management frame 903 as being forcibly finished by the transmission of the management frame 903. In this case, when the same terminal continues to be designated, the base station only has to designate the terminal (the terminal 1) in the management frame 903 again. The terminal (the terminal 2) not designated again in the management frame may operate to reset the standby operation channels to the original channel (the channel 1) at a point in time when the terminal detects that the own terminal is not designated in the management frame. Since the terminal 1 continues to be designated, the present channel only has to continue to be used as the standby operation channel.

Alternatively, in the beacon frame 901, the base station may designate a time before a transmission scheduled time of the management frame 903 as an end time of the MU-MC validity time. The terminals 1 and 2 may determine that the MU-MC validity period ends at the end time and reset the standby operation channels to the original channel. In this case, taking into account time required until the standby operation channels are reset to the original channel, the base station may transmit the management frame 903 after at least the terminal (the terminal 1) to be continuously designated is reset to the original channel.

The operation of the base station performing the MU-MC communication after transmitting the management frame 903 is the same as the operation sequence example of the MU-MC communication with the terminals 1 and 4 in FIG. 8.

In the operation sequence example shown in FIG. 11, the terminal 4 only has to perform a change of the standby operation channel after receiving the management frame 903. Therefore, channel standby operation time is shorter than when the change of the standby operation channel is performed at a point in time when the beacon frame 901 is received as in the sequence shown in FIG. 8. Therefore, it is possible to reduce power consumption of the terminal 4.

In the sequence examples shown in FIGS. 8 to 11, the base station may notify, in the beacon frame or the management frame, channels used by the terminals in the MU-MC communication or may notify the channels to the terminals beforehand at the association time or the like. In this case, when the own terminals are designated in the beacon frame or the management frame, the terminals only have to switch the channels to channels for the MU-MC communication grasped beforehand and perform the standby operation. Note that the channel 1, which is the primary channel, may be always operated even if the channel 1 is not a channel for the MU-MC communication.

The terminals may grasp, during the reception of the RTS frames, the channels used in the MU-MC communication. In this case, when the own terminals are designated in the beacon frame or the management frame, the terminals wait for frames in all channels (e.g., all of the channels 1 to 8) that are likely to be used in the MU-MC communication. The terminals only have to grasp, as channels for the MU-MC communication of the own terminals, channels in which RTS frames addressed to the own terminals are received and return CTS frames in channels that are idle in a PIFS before the reception of the RTS frames. Even in this case, the terminals only have to set only the channel 1, which is the primary channel, as the standby operation channel until being notified of the start of the MU-MC communication and, after the notification of the start is received, extend the standby operation channel to the channels 1 to 8. Therefore, it is possible to obtain a reduction effect of power consumption.

Setting examples of filters for reception (analog filters and digital filters) of the base station and the terminal after the MU-MC communication start notification are explained with reference to FIGS. 12(A) to 16(B). The operation of filter setting is explained with reference to the terminal 2 as an example. The same applies to the other terminals.

FIG. 12(A) shows a setting example of an analog filter and digital filters of the base station. FIG. 12(B) shows a setting example of an analog filter and digital filters of the terminal 2. Note that, in this example, the base station transmits one or a plurality of data frames or an aggregation frame using, for each of the terminals, channels for the MU-MC communication as a band obtained by binding the channels. The terminals transmit BA frames in the channels (note that it is also possible to return BA frames when one data frame is transmitted). Contents of the BA frames transmitted in the channels for each of the terminals are the same. Rectangles with "BA" represent the BA frames. Rectangles with characters "DATA" extending over a plurality of channels represent data frames or aggregation frames transmitted in a band obtained by bundling the plurality of channels.

As shown in FIG. 12(A), in the base station, an analog filter 1001 is set to cover all of the channels 1 to 8. The base station processes, in digital filters 1001a, 1001b, 1001c, 1001d, 1001e, and 1001f for the respective channels, signals passed through the analog filter 1001 to extract signals of the respective channels. In this example, the base station extracts, for the respective channels, digital signals of the channels 1 and 2 for the terminal 1, the channels 4 and 5 for the terminal 2, and the channels 7 and 8 for the terminal 3.

As shown in FIG. 12(B), in the terminal 2, an analog filter 1002 is set to cover all of the channels 1 to 8. The terminal 2 processes, in digital filters 1002b and 1002c for the respective standby operation channels (the channels 4 and 5), signals passed through the analog filter 1002 to extract digital signals of the respective channels. In this example, the terminal 2 monitors the channel 1, which is the primary channel, as well during the MU-MC validity period. The terminal 2 processes a signal passed through the analog filter 1002 in a digital filter 1002a corresponding to the channel 1 to extract a digital signal of the channel 1 as well.

FIG. 13A shows another setting example of the analog filter and the digital filters of the base station. FIG. 13(B) shows another setting example of the analog filter and the digital filters of the terminal 2. Explanation overlapping the explanation of FIGS. 12(A) and 12(B) is omitted.

As shown in FIG. 13(A), in the base station, an analog filter 1101 covering the channels 1 and 2 for the terminal 1, an analog filter 1102 covering the channels 4 and 5 for the terminal 2, and an analog filter 1103 covering the channels 7 and 8 for the terminal 3 are set. Filtering concerning the other channels is turned off. The base station processes, in digital filters 1101a and 1101b for the respective channels 1 and 2, signals passed through the analog filter 1101 to extract signals of the channels 1 and 2. The base station processes, in digital filters 1102a and 1102b for the respective channels 4 and 5, signals passed through the analog filter 1102 to extract signals of the channels 4 and 5. Similarly, the base station processes, in digital filters 1103a and 1103b for the respective channels 7 and 8, signals passed through the analog filter 1103 to extract signals of the channels 7 and 8.

As shown in FIG. 13(B), in the terminal 2, an analog filter 1105 covering the channels 4 and 5 for the MU-MC communication and an analog filter 1106 of the channel 1, which is the primary channel, are set. The terminal 2 processes, in digital filters 1105a and 1005b for the respective channels 4 and 5, signals passed through the analog filter 1105 to extract signals of the channels 4 and 5. The terminal 2 extracts a signal of the channel 1 in the analog filter 1106 of the channel 1. Note that, in a period other than the MU-MC validity period, an analog filter of the channel 1, which is the primary filter, is set. The terminal 2 receives a beacon frame and the like from the base station.

FIG. 14(A) shows another setting example of the analog filter of the base station. FIG. 14(B) shows another setting example of the analog filter of the terminal 2. Differences from FIGS. 13(A) and 13(B) are explained below.

As shown in FIG. 14(A), the base station sets analog filters for respective channels used in the MU-MC communication in the MU-MC validity period. Specifically, the base station sets analog filters 1201, 1202, 1203, 1204, 1205, and 1206 respectively for the channels 1, 2, 4, 5, 7, and 8. As shown in FIG. 14(B), the terminal 2 sets analog filters 1207 and 1208 respectively for the channels 4 and 5 used in the MU-MC communication. The terminal 2 sets an analog filter 1209 for the channel 1, which is the primary channel. Consequently, both of the base station and the terminal 2 extract signals for desired channels without using digital filters.

FIG. 15(A) shows another setting example of the analog filter and the digital filters of the base station. FIG. 15(B) shows another setting example of the analog filter and the digital filters of the terminal 2.

As shown in FIG. 15(A), in the MU-MC validity period, the base station sets an analog filter 1201 covering the channels 1 and 2 for the terminal 1 and an analog filter 1202 covering the channels 4 to 7 for the terminal 2. As shown in FIG. 15(B), in the MU-MC validity period, the terminal 2 sets an analog filter 1204 covering the channels 4 to 7. Note that, in this example, the terminal 2 sets an analog filter 1203 for the channel 1 in a period other than the MU-MC validity period. However, the terminal 2 releases the setting of the analog filter of the channel 1 in the MU-MC validity period (does not perform the standby operation in the channel 1). The terminal 2 extracts a signal in the analog filter 1204 and extracts signals in digital filters 1204*a*, 1204*b*, 1204*c*, and 1204*d* for the respective channels 4 to 7 to receive RTS frames for the respective channels. It is assumed that the terminal 2 determines that the RTS frames are normally received in the channels 6 and 7 but a carrier sensing result is busy in an PIFS period before reception in the channel 5 and reception fails in a CRC (Cyclic Redundancy Check) inspection in the channel 4. Therefore, the terminal 2 transmits CTS frames in the respective channels 6 and 7 and does not transmit CTS frames in the channels 4 and 5. The base station normally receives the CTS frames in the channels 6 and 7 with the analog filter 1202 covering the channels 4 to 7 and digital filters 1202*a*, 1202*b*, 1202*c*, and 1202*d* for the respective channels 4 to 7. The base station determines that the CTS frames are not received in the channels 4 and 5. The base station transmits one or a plurality of data frames or an aggregation frame in a band obtained by bundling the channels 6 and 7. The terminal returns BA frames in the channels 6 and 7 according to whether the data frames are normally received. The BA frames returned in the channels 6 and 7 are frames having the same content. Note that the terminal may transmit one BA frame in the band obtained by bundling the channels 6 and 7. Note that the base station extracts, in the digital filters 1201*a* and 1201*b* for the channels 1 and 2, signals of the channels 1 and 2 from signals passed through the analog filter 1201.

As explained above, the terminal 2 extracts signals of the respective channels with the digital filters from signals passed through the analog filter 1204. Actually, the terminal 2 applies AGC (Automatic Gain Control) to the signals passed through the analog filter 1204, processes the signals after the gain adjustment with the digital filters, and extracts signals of the respective channels. The signals passed through the analog filter 1204 include an interference signal (a busy signal) in the channel 5. The amplitude of the signals is usually extremely larger than normally received desired signals of the channels 4, 6, and 7. In the AGC, gain control is performed on the basis of total electric power. Therefore, the amplitude of the signals after the AGC are likely to be relatively extremely small compared with the amplitude of the busy signal. In this case, it is likely that signals of non-busy channels cannot be normally received (e.g., demodulated).

Figure 17:
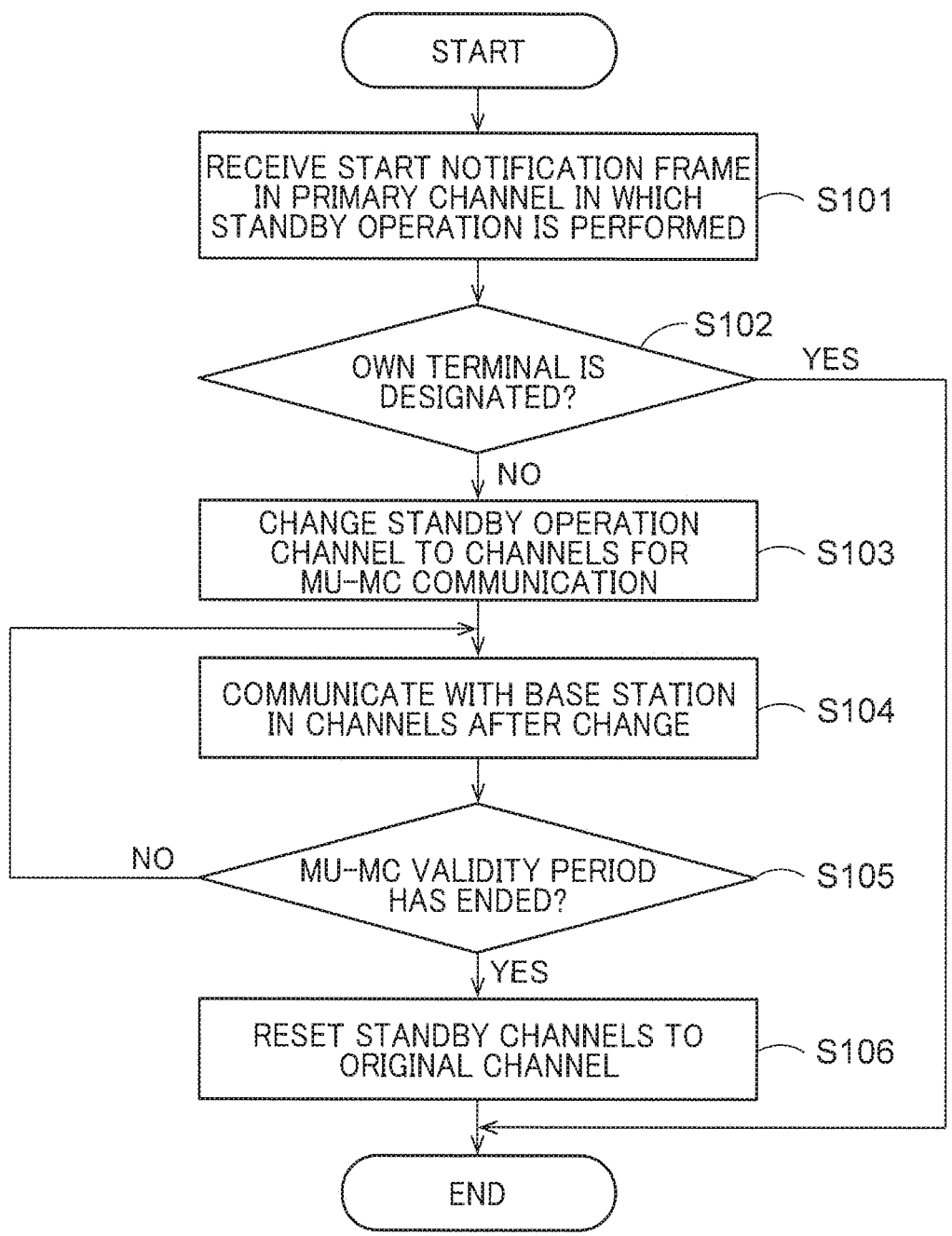
FIG. 17 is a flowchart of an example of the operation of the terminal according to the embodiment.

To suppress this problem, analog filters only have to be set for the respective channels in the terminal 2 and the base station as shown in FIGS. 16(A) and 16(B). Consequently, since the AGC is performed separately for the respective channels, it is possible to prevent the problem in which the reception in the other channels is affected by the busy channel. In examples shown in FIGS. 16(A) and 16(B), in the terminal 2, analog filters 1408, 1409, 1410, and 1411 are respectively set for the channels 4, 5, 6, and 7. An analog filter 1407 is set in the channel 1 in a period other than the MU-MC validity period. In the base station, analog filters 1401, 1402, 1403, 1404, 1405, and 1406 are respectively set in the channels 1, 2, 4, 5, 6, and 7 in the MU-MC validity period. Note that, in the base station, in a period other than the MU-MC validity period, basically, an analog filter may be set only in the channel 1 to perform the standby operation. The other channels may be turned off unless the other channels are used in particular. FIG. 17 is a flowchart of an example of the operation of the terminal according to the first embodiment.

The terminal performs the standby operation in a system primary channel, which is a channel designated in advance (S101). When receiving a start notification frame for notifying a start of the MU-MC communication, the terminal determines the own terminal is designated in the start notification frame (S102). For example, the terminal performs the determination according to whether information for specifying the own terminal (terminal specifying information) is included in the start notification frame. As the information for specifying the own terminal, there is an AID or a MAC address of the own terminal, a group ID of a group to which the own terminal belongs, or the like. As the start notification frame, there is a beacon frame or a separately defined management frame, or a control frame, or the like.

When the terminal specifying information of the own terminal is included in the start notification frame, the terminal changes the standby operation channel to the channels for the MU-MC communication in time for a start time of the MU-MC validity period (S103). The start time of the MU-MC validity period may be designated in the start notification frame or may be designated in another frame beforehand. Alternatively, the start time of the MU-MC validity period may be decided in the system beforehand as, for example, a time after fixed time from the reception of the start notification frame. When a transmission time or a reception time of the start notification frame is the start time of the MU-MC validity period, the terminal only has to perform the channel change immediately after the reception of the start notification frame.

Note that, when the primary channel is not included in the channels for the MU-MC communication, the standby operation may be performed in the primary channel in addition to the channels for the MU-MC communication. As a method for changing the standby operation channels to the channels for the MU-MC communication, the change is sometimes performed by setting of an analog filter, setting of digital filters, and setting of both of the analog filter and the digital filters. Examples of these variations are as explained with reference to FIGS. 12 to 16.

After receiving the start notification for the MU-MC communication, the terminal performs the MU-MC communication with the base station in the standby operation channels (S104). For example, the terminal receives RTS frames in the standby operation channels and returns CTS frames after an SIFS in channels in which a carrier sensing result in fixed time (a PIFS, etc.) before the reception is idle. The terminal stands by for frames such as data frames in the channels in which the CTS frames are returned. When frames are normally received in the channels, the terminal returns ACK (or BA frames).

The terminal determines whether the MU-MC validity period has ended (S105). When the MU-MC validity period has ended, the terminal resets the standby operation channels to the original channel (the primary channel, etc.) (S106). As a method of determining the end of the MU-MC validity period, an end time may be notified beforehand in a start notification frame or a frame separate from the start notification frame. When the own terminal is not designated as a target of the MU-MC communication in the next beacon frame, the terminal may determine that the MU-MC validity period has ended. Alternatively, when the start notification frame designating the own terminal as the target of the MU-MC communication is not received by predetermined timing after the transmission of the ACK frames within the present beacon interval, the terminal may determine that the MU-MC validity period has ended.

Figure 18:
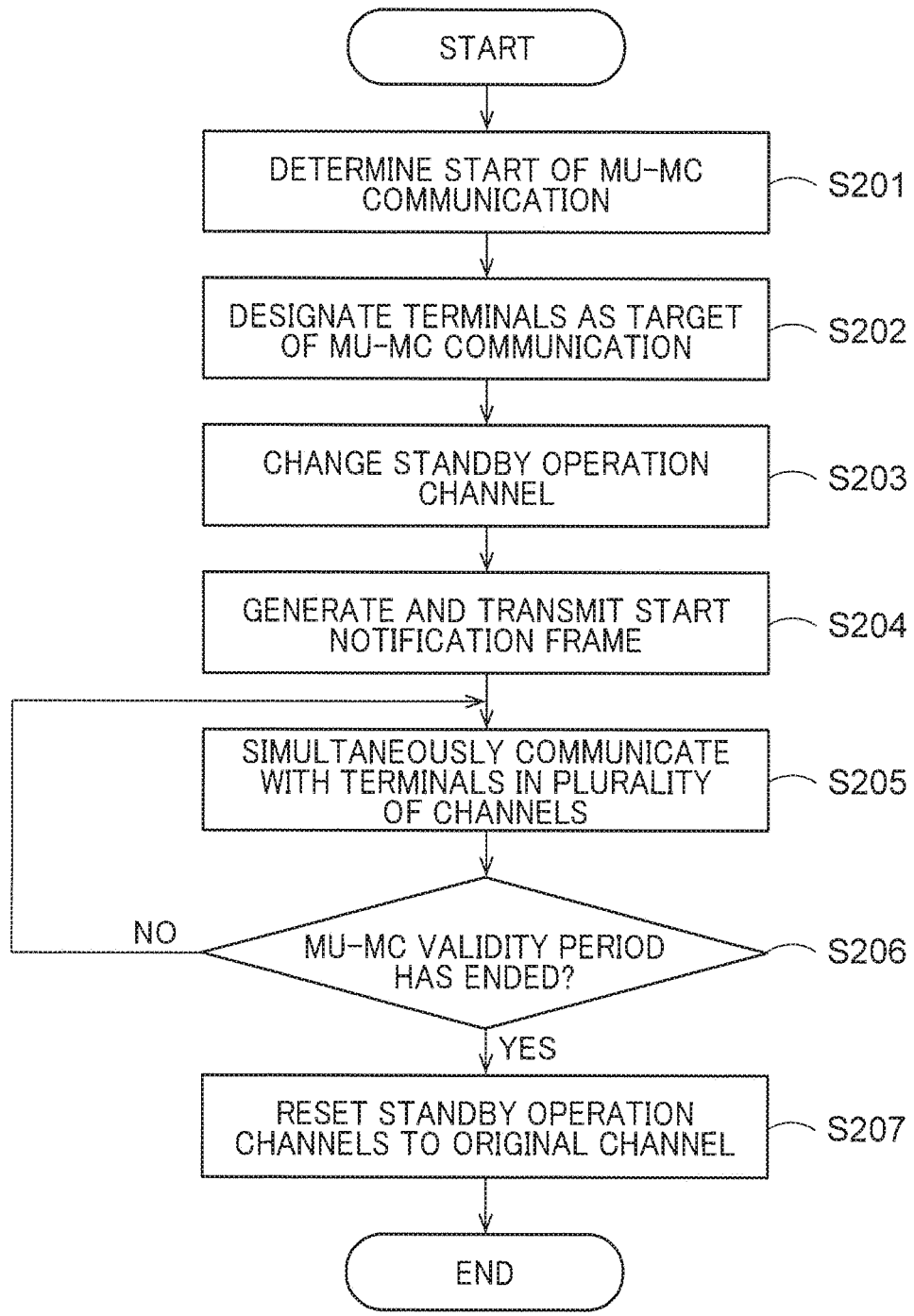
FIG. 18 is a flowchart of an example of the operation of the base station according to the embodiment.

FIG. 18 is a flowchart of an example of the operation of the base station according to this embodiment.

When determining a start of the MU-MC communication (S201), the base station determines a terminal set as a target of the MU-MC communication (S202) and changes the standby operation channels of the own station to channels used in the MU-MC communication (S203). However, the standby operation may be performed in the primary channel even if the primary channel is not used in the MU-MC communication. The base station generates a frame for notifying the start of the MU-MC communication (a start notification frame) and transmits the start notification frame in the primary channel (S204). For example, information for specifying the designated terminal is included in the start notification frame. Besides, information for specifying channels used by the terminals in the MU-MC communication, information for specifying a start time, information for specifying an end time, or a combination of these kinds of information may be included in the start notification frame. The order of step S202 and step S203 may be opposite.

After the transmission of the start notification frame, at the start time of the MU-MC communication, which takes into account setup times of the terminals, or after the start time, the base station simultaneously communicates with the terminals in the channels for the MU-MC communication (S205). For example, the base station transmits RTS frames to the terminals in the channels for the MU-MC communication for the respective terminals. The base station transmits frames such as data frames or an aggregation frame after an SIFS in channels in which CTS frames are returned. The base station receives ACK frames of frames that the base station has successfully transmitted (or receives BA frames). If there are frames that the base station has failed in transmitting, the base station may retransmit the frames. Note that the base station may retransmit the frames in the following MU-MC communication or may retransmit the frames in unicast communication after an end of the present MU-MC validity period.

The base station determines whether the MU-MC validity period has ended (S206). When the MU-MC validity period has ended, the base station resets the standby operation channels to the original channel (the primary channel) (S207).

In this embodiment, the end timing of the MU-MC validity period is decided beforehand by, for example, designating the end time and designating the number of times of the beacon interval beforehand. As another method, a frame for notifying the end of the MU-MC validity period may be defined. The base station may end the MU-MC validity period by transmitting the frame. For example, an MU-MC Information 2 field may be added, for example, behind or in front of the MU-MC Information field of the frame format shown in FIG. 4. In the field, a bit 1 may be set when the end is notified or a bit 0 may be set otherwise (or vice versa). Alternatively, it is also possible to notify the end using a null bit of the HT control Middle subfield shown in FIG. 6B. The terminal set as an end target only has to be designated by an information element of the format shown in FIG. 5(B). The information element only has to be set in a body field of a frame. The terminal that has received the frame for notifying the end only has to reset the standby operation channels to the original channel.

As explained above, according to this embodiment, by notifying the start of the MU-MC communication, the terminals perform the standby operation in the primary channel before the MU-MC communication start notification. After the notification, the terminals switch the primary channel to the channels for the MU-MC communication and perform the standby operation in the channels for the MU-MC communication. Consequently, before the notification, it is unnecessary to perform the standby operation in channels not in use. Therefore, it is possible to reduce power consumption. It is possible to further reduce the power consumption by performing the standby operation according to the start time of the MU-MC validity period. Similarly, the base station performs the standby operation in the primary channel before the determination or the notification of the start of the MU-MC communication. After the determination or the notification, the base station switches the primary channel to the channels for the MU-MC communication. Consequently, before the MU-MC communication, it is unnecessary to perform the standby operation in channels not in use.

Second Embodiment

In the first embodiment, the form in which the base station and the plurality of terminals communicate with each other is explained. However, the present invention can also be carried out when the terminals perform the MU-MC communication not via the base station. For example, one of the plurality of terminals is set on a transmission side and two or more terminals among the remaining terminals are set on a reception side to perform the MU-MC communication. Note that, as a standard for the terminals communicating with one another not via the base station, WiFi Direct and the like are known. When a terminal adapted to the WiFi Direct enables a function of the terminal, the terminal is recognized as the base station from the other terminals. It is possible to connect the terminals in a one-to-one relation or a one-to-multiple relation.

Third Embodiment

As described in the first and second embodiments, the channels within the predetermined frequency band are channel 1 to channel 8 and these channels are consecutive channels. Below, the consecutiveness will be further described.

The channel numbers in the IEEE802.11 standard are provided at 5 MHz intervals, therefore, in the case of a channel width of 20 MHz, an interval between channel numbers at which channels do not overlap is 4. In the present embodiment, consecutive channels in a channel set mean consecutive channels that do not overlap. The channel numbers in the embodiment are for convenience, and ch.1 should be interpreted as channel number 36 in the 5 GHz band in the IEEE802.11 standard and ch.2 should be interpreted as channel number 40 in the 5 GHz band in the IEEE802.11 standard.

[5 GHz Band]

In the 5 GHz band of IEEE802.11 standard, since channel numbers are basically used at 20 MHz intervals, there is no problem in using the channels based on the actually used channel numbers.

[2.4 GHz Band]

Figure 20:
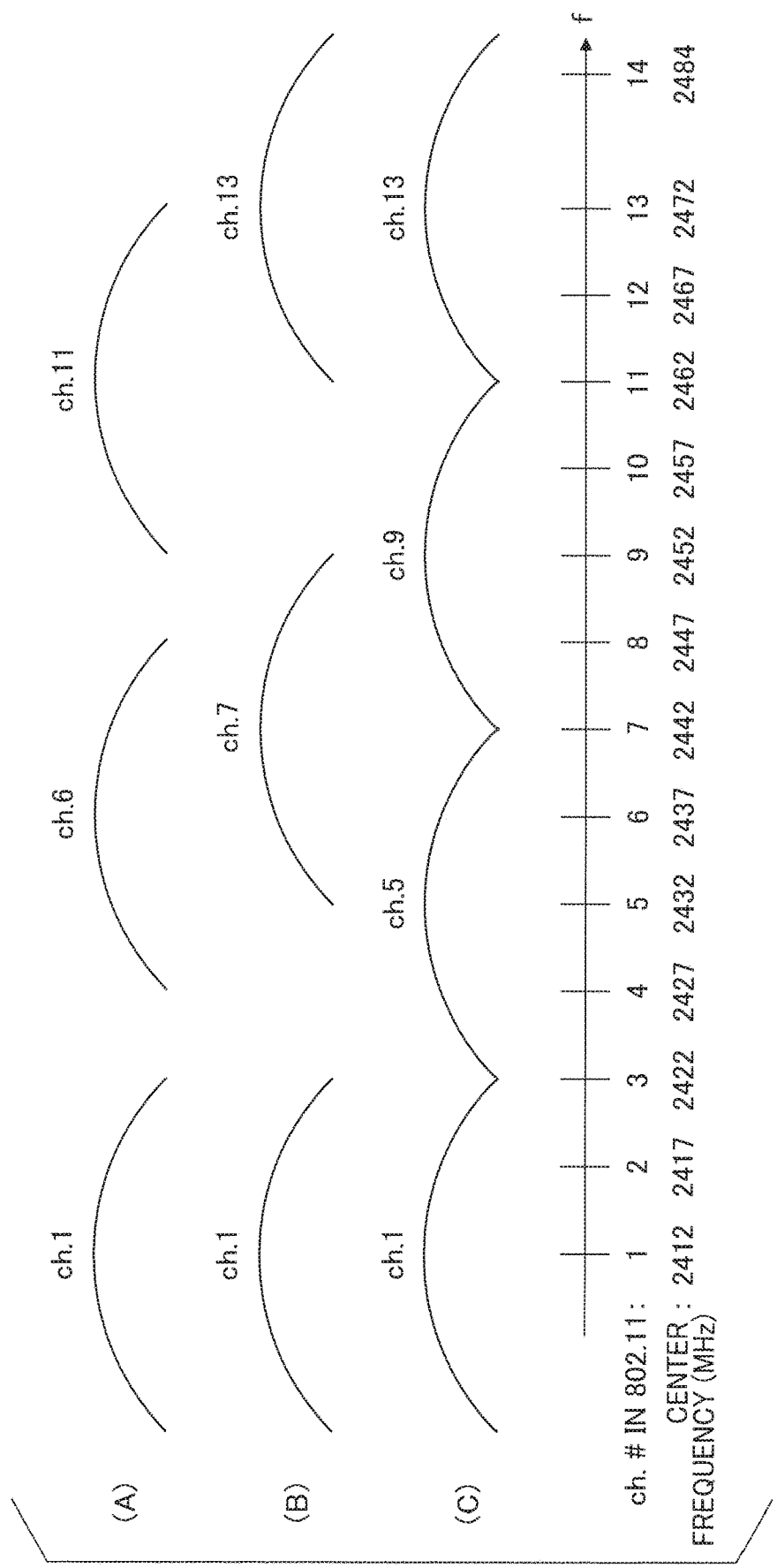
FIG. 20 is an explanatory diagram of channel arrangement.

On the other hand, in the 2.4 GHz band, as illustrated in FIG. 20, reference channel selection is performed at 25 MHz intervals (FIG. 20(A)) in such as North America and China, and at 30 MHz intervals (FIG. 20(B)) in Europe. Therefore, it may be performed at 25 MHz intervals (FIG. 20(A)) mirroring the selection for North America and China where, for example, ch.1 in the embodiment may be set to channel number 1 in the 2.4 GHz band in IEEE802.11 standard and ch.2 may be set to channel number 6 in the 2.4 GHz band in IEEE802.11 standard. Alternatively, it may be performed at 30 MHz intervals (FIG. 20(B)) mirroring the selection for Europe where, for example, ch.1 in the embodiment is set to channel number 1 in the 2.4 GHz band in the IEEE802.11 standard and ch.2 is set to channel number 7 in the 2.4 GHz band in the IEEE802.11 standard. Alternatively, as illustrated in FIG. 20(C), mirroring the 20 MHz channel intervals in the 5 GHz band, ch.1 in the embodiment may be set to channel number 1 in the 2.4 GHz band in IEEE802.11 standard and ch.2 may be set to channel number 5 in the 2.4 GHz band in IEEE802.11 standard. FIG. 20(C) exemplifies a future possible channel selection other than the ones in FIG. 20(A) and FIG. 20(B). However, in the case of such as North America, China and Europe, when another wireless communication system selects, as at least part of the channels, channel number 6 or 7 in the 2.4 GHz band, the frequency band partially overlaps with that of channel number 5. In this case, a frequency band in which mutual wireless communication systems influence each other broadens, and channel utilization efficiency decreases.

Fourth Embodiment

Figure 21:
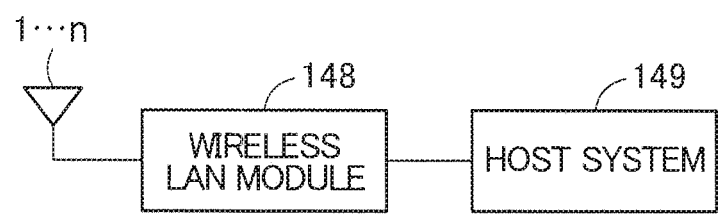
FIG. 21 is a diagram showing an exemplary overall configuration of a terminal or a base station.

FIG. 21 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 22:
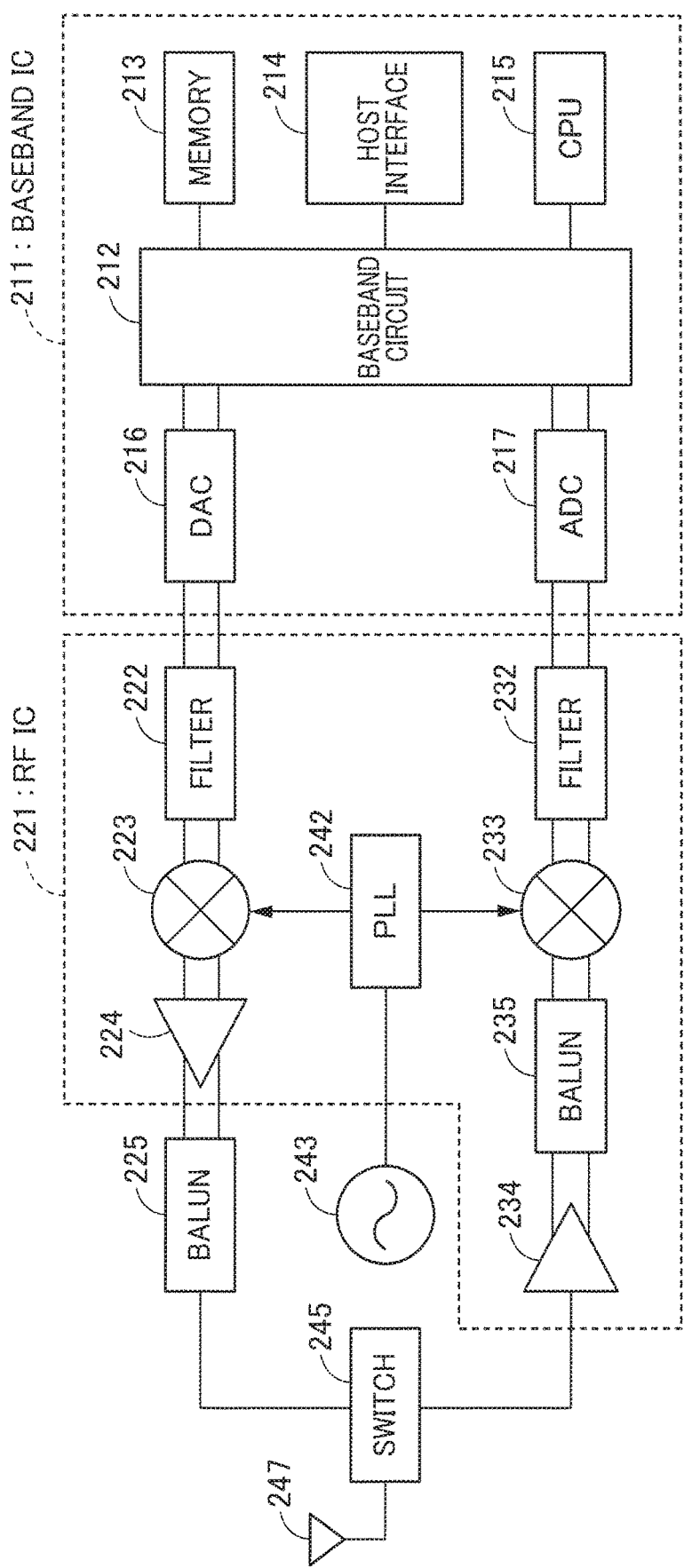
FIG. 22 is a diagram showing an exemplary hardware configuration of a wireless communication device equipped at a base station or a terminal according to an embodiment.

FIG. 22 shows an example of hardware configuration of a wireless LAN module. The configuration can also be applied when the wireless communication apparatus is mounted on either one of the terminal that is a non-base station and the base station. Therefore, the configuration can be applied as an example of specific configuration of the wireless communication device shown in FIG. 2 or 3. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication apparatus) includes a baseband IC (Integrated Circuit) 211, an RF (Radio Frequency) IC 221, a balun 225, the switch 245, and the antenna 247. The wireless communication integrated circuit according to the present embodiment corresponds, for example, to the baseband IC or a set of the baseband ID and RF IC. The wireless communication integrated circuit further include the balun 225, switch 245, antenna 24 or a combination thereof.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal"). The baseband circuit 212, the CPU 215 or both of them carries out processing regarding OFDMA. The baseband circuit 212, the CPU 215 or both of them may control operations on a transmission filter and a reception filter according to a setting of a used channel(s) so as to extract signals of the channel(s). Another controller which controls the filters may be provided and the baseband circuit 212, the CPU 215 or both of them may output an instruction to the controller to control the filters. The filters to be controlled may be analog filters (in case of the filters 222, 232) or digital filters.

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Fifth Embodiment

Figure 23:
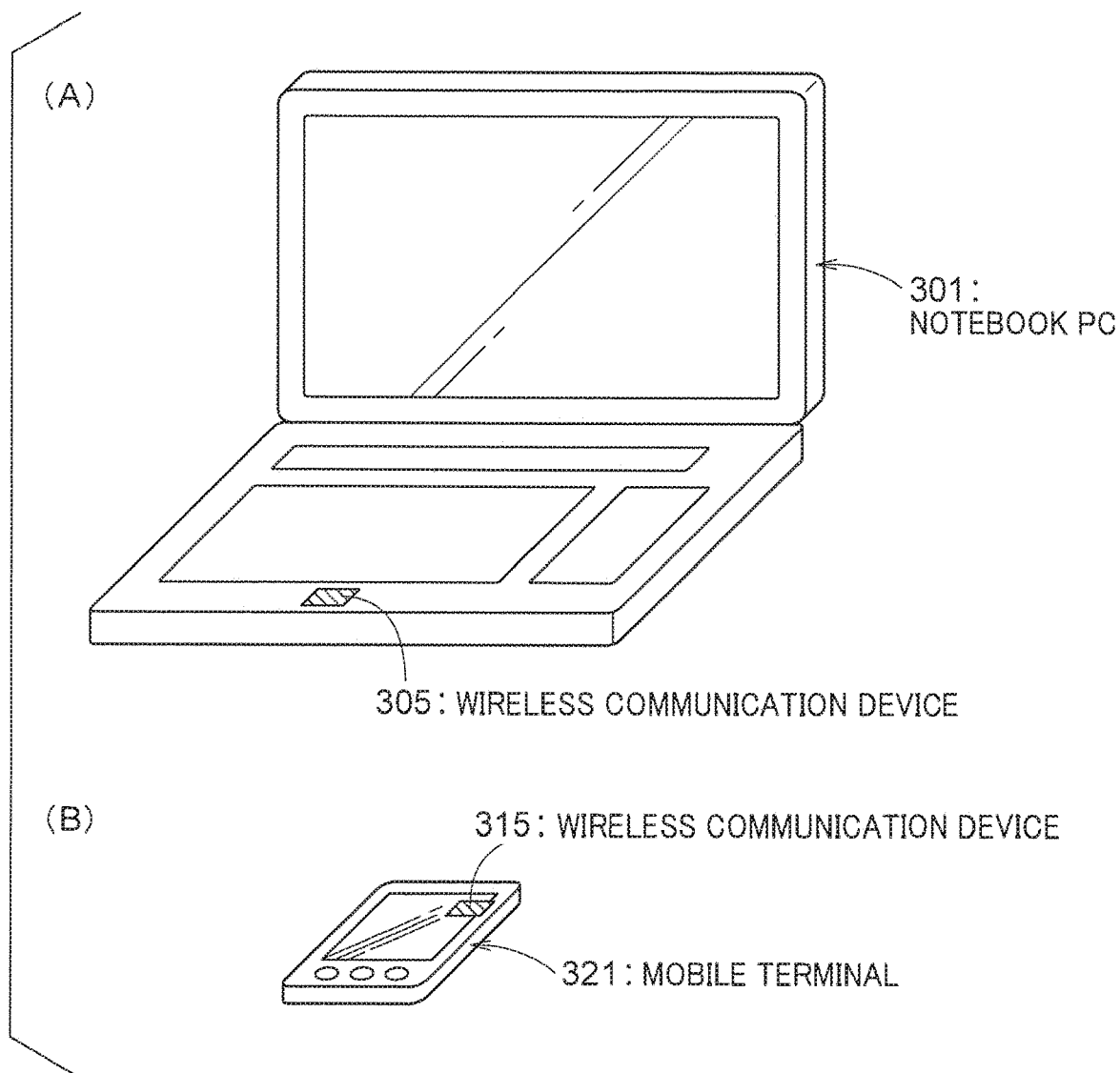
FIG. 23 is a perspective view of a terminal according to an embodiment.

FIG. 23(A) and FIG. 23(B) are perspective views of wireless terminal according to the fifth embodiment. The wireless terminal in FIG. 23(A) is a notebook PC 301 and the wireless communication device (or a wireless device) in FIG. 23(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 24:
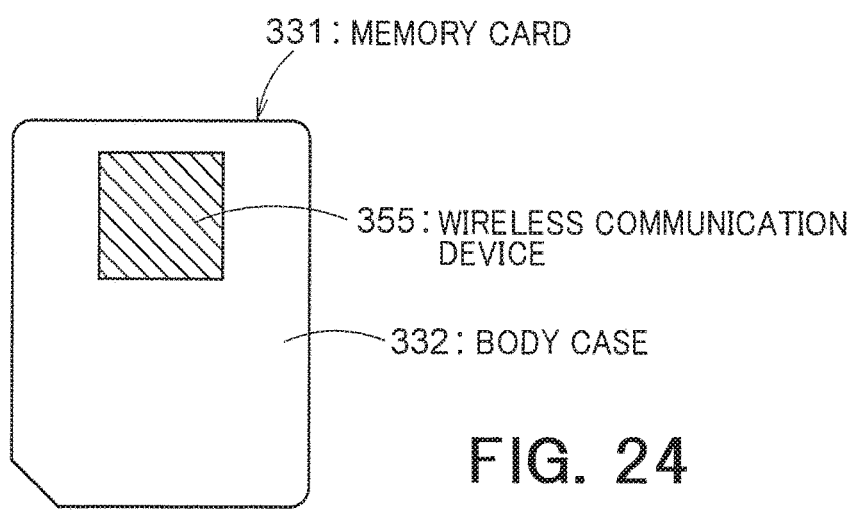
FIG. 24 is a diagram showing a memory card according to an embodiment.

Moreover, a wireless communication device installed in a terminal (which may indicate a base station) can also be provided in a memory card. FIG. 24 illustrates an example of a wireless communication device mounted on a memory card. A memory card 331 contains a wireless communication device 355 and a body case 332. The memory card 331 uses the wireless communication device 355 for wireless communication with external devices. Here, in FIG. 24, the description of other installed elements (for example, a memory, and so on) in the memory card 331 is omitted.

Sixth Embodiment

In the sixth embodiment, a bus, a processor unit and an external interface unit are provided in addition to the configuration of the wireless communication device according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the wireless communication integrated circuit, the first controller, the second controller or the plural processing of these elements according to the present embodiment, or may be another processor that performs a process relating to extending or altering the functions of the processing of the element(s). The processing unit in which the firmware operates may be included in the bases station or the wireless terminal or both of them according to the present embodiment. Alternatively, the processing unit may be included in the integrated circuit of the wireless communication device installed in the base station, or in the integrated circuit of the wireless communication device installed in the wireless terminal.

Seventh Embodiment

In the seventh embodiment, a clock generating unit is provided in addition to the configuration of the wireless communication device according to any of any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eighth Embodiment

In the eighth embodiment, a power source unit, a power source controlling unit and a wireless power feeding unit are included in addition to the configuration of the wireless communication device according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Ninth Embodiment

In the ninth embodiment, a SIM card is added to the configuration of the wireless communication device according to any of the above embodiments. For example, the SIM card is connected with the MAC processor or the controller in the wireless communication device. Thus, by adopting a configuration in which the SIM card is included in the wireless communication device, authentication processing can be easily performed.

Tenth Embodiment

In the tenth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Eleventh Embodiment

In the eleventh embodiment, an LED unit is added to the configuration of the wireless communication device according to any of the above embodiments. For example, the LED unit is connected to at least one of the MAC processor, the transmission processing circuit, the reception processing circuit or the controller. Thus, by adopting a configuration in which the LED unit is included in the wireless communication device, notifying the operation state of the wireless communication device to the user can be easily done.

Twelfth Embodiment

In the twelfth embodiment, a vibrator unit is included in addition to the configuration of the wireless communication device according to any of the first to fifth embodiments. For example, the vibrator unit is connected to at least one of the MAC processor, the transmission processing circuit, the reception processing circuit or the controller. Thus, by adopting a configuration in which the vibrator unit is included in the wireless communication device, notifying the operation state of the wireless communication device to the user can be easily done.

Thirteenth Embodiment

In the thirteenth embodiment, the configuration of the wireless communication device includes a display in addition to the configuration of the wireless communication device (which may indicate the wireless communication device mounted in the terminal, the wireless communication device mounted in the base station) according to any one of the above embodiments. The display may be connected to the first controller or the second controller in the wireless communication device via a bus (not shown). As seen from the above, the configuration including the display to display the operation state of the wireless communication device on the display allows the operation status of the wireless communication device to be easily notified to a user.

Fourteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 25:
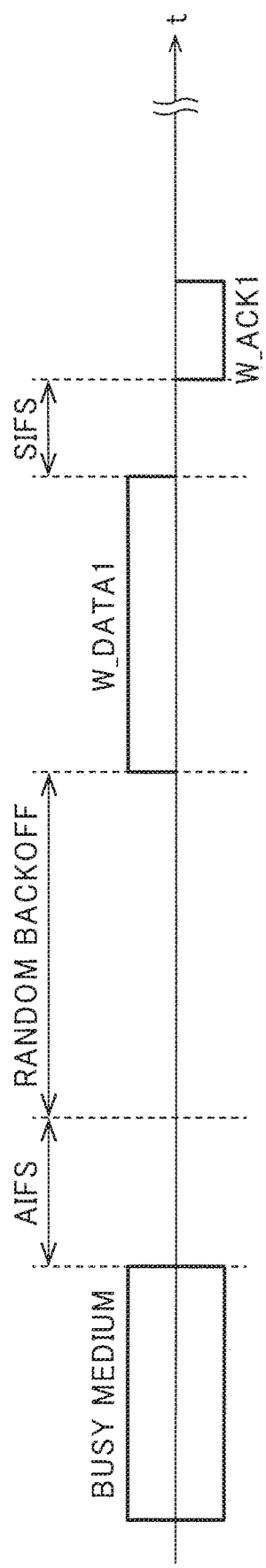
FIG. 25 is a diagram showing an example of frame exchange during a contention period.

Here, FIG. 25 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device comprising:
communication circuitry configured to receive a first frame notifying a start of OFDMA (Orthogonal Frequency Division Multiple Access) communication via a first channel, the OFDMA communication being resource unit-based OFDMA communication; and
controlling circuitry configured to switch an operating channel of the communication circuitry from the first channel to at least a first resource unit of a plurality of resource units included in a second channel for the OFDMA communication when the first frame is received, the second channel being different from the first channel, wherein
each of the resource units includes one or more subcarriers among a plurality of subcarriers configured in the second channel,
the controlling circuitry is configured to perform the OFDMA communication using the operating channel switched to the at least first resource unit during at least part of a validity period of the OFDMA communication, the validity period being stated by the first frame,
the controlling circuitry is configured to detect that the validity period of the OFDMA communication ends in response to determining that a second frame ending the validity period of the OFDMA communication is received, and switch the operating channel of the communication circuitry from at least the first resource unit to the first channel.

2. The wireless communication device according to claim 1, wherein the controlling circuitry is configured to keep the first channel active even when the operating channel is switched to at least the first resource unit.

3. The wireless communication device according to claim 1, wherein the controlling circuitry is configured to check whether information specifying the wireless communication device as a target terminal for the OFDMA communication is included in the first frame and switch the operating channel of the communication circuitry from the first channel to at least the first resource unit when the information is included in the first frame.

4. The wireless communication device according to claim 3, wherein the second frame is a beacon frame in which the information specifying the wireless communication device as a target terminal for the OFDMA communication is not included.

5. The wireless communication device according to claim 1, wherein the controlling circuitry is configured to set an analog filter to extract a signal of the first resource unit and block a signal of a resource unit other than the first resource unit in the second channel.

6. The wireless communication device according to claim 1, wherein the controlling circuitry is configured to set a digital filter to extract a signal of the first resource unit from a digital signal, the digital signal being obtained by analog-to-digital (AD) converting a signal passed through an analog filter.

7. The wireless communication device according to claim 1, further comprising a transmitter configured to transmit information representing setup time required to switch the operating channel from the first channel to at least the first resource unit.

8. The wireless communication device according to claim 1, wherein
the first frame includes information specifying a start time of the OFDMA communication, and the controlling circuitry is configured to switch the operating channel of the communication circuitry from the first channel to at least the first resource unit by the start time.

9. The wireless communication device according to claim 8, wherein the start time is a time later than a time added by set up time required to switch the operating channel of the communication circuitry from the first channel to at least the first resource unit to a received time of the first frame.

10. The wireless communication device according to claim 1, further comprising at least one antenna.

11. The wireless communication device according to claim 1, wherein
the controlling circuitry is configured to detect that the validity period ends in response to determining that a predetermined number of beacon intervals elapse after the first frame is received, instead of receiving the second frame.

12. A wireless communication device comprising:
a transmitter configured to transmit, via a first channel, a first frame notifying a start of OFDMA (Orthogonal Frequency Division Multiple Access) communication, the OFDMA communication being resource unit-based OFDMA communication; and
controlling circuitry configured to switch an operating channel of the transmitter from the first channel to a plurality of resource units included in one or more channels after the first frame is transmitted, the one or more channels being different from the first channel, and perform the OFDMA communication via the plurality of resource units during at least part of a validity period of the OFDMA communication, the validity period being stated by the first frame, wherein
each of the plurality of resource units includes one or more subcarriers, and
the controlling circuitry is configured to transmit a second frame ending the validity period of the OFDMA communication in response to determining to cause the validity period of the OFDMA communication to end, and switch the operating channel of the communication circuitry from the plurality of resource units to the first channel.

13. The wireless communication device according to claim 12, further comprising at least one antenna.

14. A wireless communication method performed by a wireless communication device, comprising:
receiving a first frame notifying a start of resource unit-based OFDMA (Orthogonal Frequency Division Multiple Access) communication via a first channel, the OFDMA communication being resource unit-based OFDMA communication;
switching an operating channel from the first channel to at least a first resource unit of a plurality of resource units included in a second channel when the first frame is received, the second channel being different from the first channel, wherein
each of the plurality of resource units includes one or more subcarriers among a plurality of subcarriers configured in the second channel;
performing the OFDMA communication using the operation channel including the at least first resource unit during at least part of a validity period of the OFDMA communication, the validity period being stated by the first frame;
detecting that the validity period of the OFDMA communication ends in response to determining that a second frame ending the validity period of the OFDMA communication is received; and
switching the operating channel from at least the first resource unit to the first channel.

15. The wireless communication method according to claim 14, further comprising: keeping the first channel active even when the operating channel is switched to at least the first resource unit.

16. The wireless communication method according to claim 14, further comprising: checking whether information specifying the wireless communication device as a target terminal for the OFDMA communication is included in the first frame and switching the operating channel to at least the first resource unit when the information is included in the first frame.

17. The wireless communication method according to claim 14, further comprising: setting an analog filter to extract a signal of the first resource unit and block a signal of a resource unit other than the first resource unit in the second channel.

18. The wireless communication method according to claim 14, comprising: setting a digital filter to extract a signal of the first resource unit from a digital signal, the digital signal obtained by analog-to-digital (AD) converting a signal passed through an analog filter.

19. The wireless communication method according to claim 14, further comprising: transmitting information representing setup time required to switch the operating channel from the first channel to at least the first resource unit.

20. The wireless communication method according to claim 14, wherein
the first frame includes information specifying a start time of the OFDMA communication, and
the method comprises switching the operating channel from the first channel to at least the first resource unit by the start time.

21. The wireless communication method according to claim 20, wherein the start time is a time later than a time added by set up time required to switch the operating channel from the first channel to at least the first resource unit to a received time of the first frame.

* * * * *